(12) United States Patent
Shah et al.

(10) Patent No.: US 12,073,552 B2
(45) Date of Patent: *Aug. 27, 2024

(54) AUTOMATED QUALITY CONTROL FOR THREE-DIMENSIONAL (3D) PRINTED MOLD FOR ORTHODONTIC ALIGNER

(71) Applicant: Align Technology, Inc., San Jose, CA (US)

(72) Inventors: Paren Indravadan Shah, Santa Clara, CA (US); Anatoliy Parpara, Moscow (RU); Andrey Cherkas, Krasnoznamensk (RU); Alexey Kalinichenko, Cary, NC (US)

(73) Assignee: Align Technology, Inc., San Jose, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 17/370,966

(22) Filed: Jul. 8, 2021

(65) Prior Publication Data

US 2022/0036531 A1    Feb. 3, 2022

Related U.S. Application Data

(63) Continuation of application No. 16/685,848, filed on Nov. 15, 2019, now Pat. No. 11,189,021.

(Continued)

(51) Int. Cl.
*G06T 7/00* (2017.01)
*B29C 64/386* (2017.01)

(Continued)

(52) U.S. Cl.
CPC .......... *G06T 7/0008* (2013.01); *B29C 64/386* (2017.08); *B33Y 50/00* (2014.12);
(Continued)

(58) Field of Classification Search
CPC . G06T 7/0008; G06T 7/12; G06T 7/11; G06T 7/70; G06T 7/001; G06T 7/60;
(Continued)

(56) References Cited

U.S. PATENT DOCUMENTS 6,210,162 B1   4/2001  Chishti et al.
6,497,574 B1  12/2002  Miller
(Continued)

FOREIGN PATENT DOCUMENTS

CN    105642895 A    6/2016
CN    105965894 A    9/2016
(Continued)

*Primary Examiner* — Gregory M Desire
(74) *Attorney, Agent, or Firm* — Lowenstein Sandler LLP

(57) ABSTRACT

Systems and methods for performing automated quality control for 3D printed molds for orthodontic aligners are described. A method includes generating a plurality of images of the 3D printed mold for the orthodontic aligner using one or more imaging devices, wherein each image of the plurality of images depicts a distinct region of the 3D printed mold for the orthodontic aligner; processing the plurality of images by a processing device to identify one or more types of manufacturing defects of the 3D printed mold for the orthodontic aligner, wherein for each type of manufacturing defect a probability that an image comprises a defect of that type of manufacturing defect is determined; and classifying, by the processing device, the 3D printed mold for the orthodontic aligner as defective based on identifying the one or more types of manufacturing defects.

25 Claims, 20 Drawing Sheets

Related U.S. Application Data

(60) Provisional application No. 62/768,770, filed on Nov. 16, 2018.

(51) Int. Cl.
  *B33Y 50/00* (2015.01)
  *G06K 9/62* (2022.01)
  *G06T 7/11* (2017.01)
  *G06T 7/12* (2017.01)
  *G06T 7/60* (2017.01)
  *G06T 7/70* (2017.01)
  *G06V 10/98* (2022.01)
  *G06V 20/64* (2022.01)
  *H04N 23/74* (2023.01)

(52) U.S. Cl.
  CPC ............... *G06T 7/001* (2013.01); *G06T 7/11* (2017.01); *G06T 7/12* (2017.01); *G06T 7/60* (2013.01); *G06T 7/70* (2017.01); *G06V 10/993* (2022.01); *G06V 20/64* (2022.01); *H04N 23/74* (2023.01); *G06T 2207/10152* (2013.01); *G06T 2207/20076* (2013.01); *G06T 2207/20081* (2013.01); *G06T 2207/20132* (2013.01); *G06T 2207/30036* (2013.01); *G06T 2207/30144* (2013.01); *G06T 2207/30168* (2013.01)

(58) Field of Classification Search
  CPC . G06T 2207/10152; G06T 2207/20076; G06T 2207/20081; G06T 2207/20132; G06T 2207/30036; G06T 2207/30144; G06T 2207/30168; B33Y 50/00; B29C 64/386; G06V 20/64; G06V 10/993; H04N 23/74
  See application file for complete search history.

(56) References Cited

U.S. PATENT DOCUMENTS

| | | | |
|---|---|---|---|
| 6,957,118 | B2 | 10/2005 | Kopelman et al. |
| 6,976,627 | B1 | 12/2005 | Culp et al. |
| 7,092,784 | B1 | 8/2006 | Simkins |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |
| 7,384,266 | B2 | 6/2008 | Wen |
| 7,435,084 | B2 | 10/2008 | Liu et al. |
| 7,472,789 | B2 | 1/2009 | Wu et al. |
| 7,476,100 | B2 | 1/2009 | Kuo |
| 7,481,647 | B2 | 1/2009 | Sambu et al. |
| 7,604,181 | B2 | 10/2009 | Culp et al. |
| 7,641,828 | B2 | 1/2010 | DeSimone et al. |
| 7,648,360 | B2 | 1/2010 | Kuo |
| 7,653,455 | B2* | 1/2010 | Cinader, Jr. ........... A61C 1/084 700/118 |
| 7,674,422 | B2 | 3/2010 | Kuo |
| 7,711,447 | B2 | 5/2010 | Lu et al. |
| 7,748,199 | B2 | 7/2010 | Sankaran et al. |
| 7,802,987 | B1 | 9/2010 | Phan |
| 7,819,659 | B2 | 10/2010 | Wen |
| 7,831,322 | B2 | 11/2010 | Liu et al. |
| 7,840,373 | B2 | 11/2010 | Culp et al. |
| 7,922,490 | B2 | 4/2011 | Wen |
| 7,957,824 | B2 | 6/2011 | Boronvinskih et al. |
| 8,019,465 | B2 | 9/2011 | Spiridonov et al. |
| 8,030,588 | B2 | 10/2011 | Culp et al. |
| 8,087,932 | B2 | 1/2012 | Liu |
| 8,374,714 | B2* | 2/2013 | Dunne ................... A61C 9/002 700/118 |
| 8,636,513 | B2 | 1/2014 | Wen |
| 8,765,031 | B2 | 7/2014 | Li et al. |
| 8,776,391 | B1 | 7/2014 | Kaza et al. |
| 9,108,338 | B2 | 8/2015 | Sirovskiy et al. |
| 9,403,238 | B2 | 8/2016 | Culp |
| 9,943,386 | B2 | 4/2018 | Webber et al. |
| 9,943,991 | B2 | 4/2018 | Tanugula et al. |
| 10,011,050 | B2* | 7/2018 | Kitching ................ A61C 7/002 |
| 10,336,055 | B2* | 7/2019 | Das .......................... B22C 9/24 |
| 10,336,102 | B2 | 7/2019 | Cole |
| 10,492,888 | B2 | 12/2019 | Chen et al. |
| 10,495,973 | B2 | 12/2019 | Cole |
| 10,548,690 | B2* | 2/2020 | Wen ....................... G16H 30/20 |
| 10,575,925 | B2* | 3/2020 | Van Esbroeck .......... A61C 7/08 |
| 10,874,483 | B2 | 12/2020 | Boronkay |
| 10,888,395 | B2 | 1/2021 | Kopelman |
| 10,959,810 | B2 | 3/2021 | Li et al. |
| 11,045,282 | B2 | 6/2021 | Kopelman et al. |
| 2004/0243361 | A1 | 12/2004 | Steuben et al. |
| 2006/0093982 | A1 | 5/2006 | Wen |
| 2006/0093987 | A1 | 5/2006 | Wen |
| 2006/0093993 | A1 | 5/2006 | Wen |
| 2006/0127850 | A1 | 6/2006 | Wen |
| 2006/0127857 | A1 | 6/2006 | Zhenhuan et al. |
| 2006/0127858 | A1 | 6/2006 | Wen |
| 2006/0127859 | A1 | 6/2006 | Wen |
| 2006/0127860 | A1 | 6/2006 | Wen |
| 2006/0172250 | A1 | 8/2006 | Wen |
| 2006/0199145 | A1 | 9/2006 | Liu et al. |
| 2007/0092853 | A1 | 4/2007 | Liu et al. |
| 2007/0243502 | A1 | 10/2007 | Wen |
| 2008/0083348 | A1 | 4/2008 | Kuo et al. |
| 2009/0148814 | A1 | 6/2009 | Li et al. |
| 2020/0078137 | A1 | 3/2020 | Chen et al. |
| 2020/0130237 | A1 | 4/2020 | Mojdeh et al. |
| 2020/0160497 | A1 | 5/2020 | Shah et al. |
| 2020/0214801 | A1 | 7/2020 | Wang et al. |
| 2020/0290262 | A1 | 9/2020 | Aguilar Mendez et al. |
| 2020/0306017 | A1 | 10/2020 | Chavez et al. |
| 2020/0316856 | A1 | 10/2020 | Mojdeh et al. |
| 2021/0030516 | A1 | 2/2021 | O'Leary et al. |

FOREIGN PATENT DOCUMENTS

| | | |
|---|---|---|
| CN | 106290375 A | 1/2017 |
| CN | 107486415 A | 12/2017 |
| CN | 107941808 A | 4/2018 |
| CN | 108458658 A | 8/2018 |
| CN | 108760747 A | 11/2018 |
| KR | 20180029789 A | 3/2018 |

\* cited by examiner

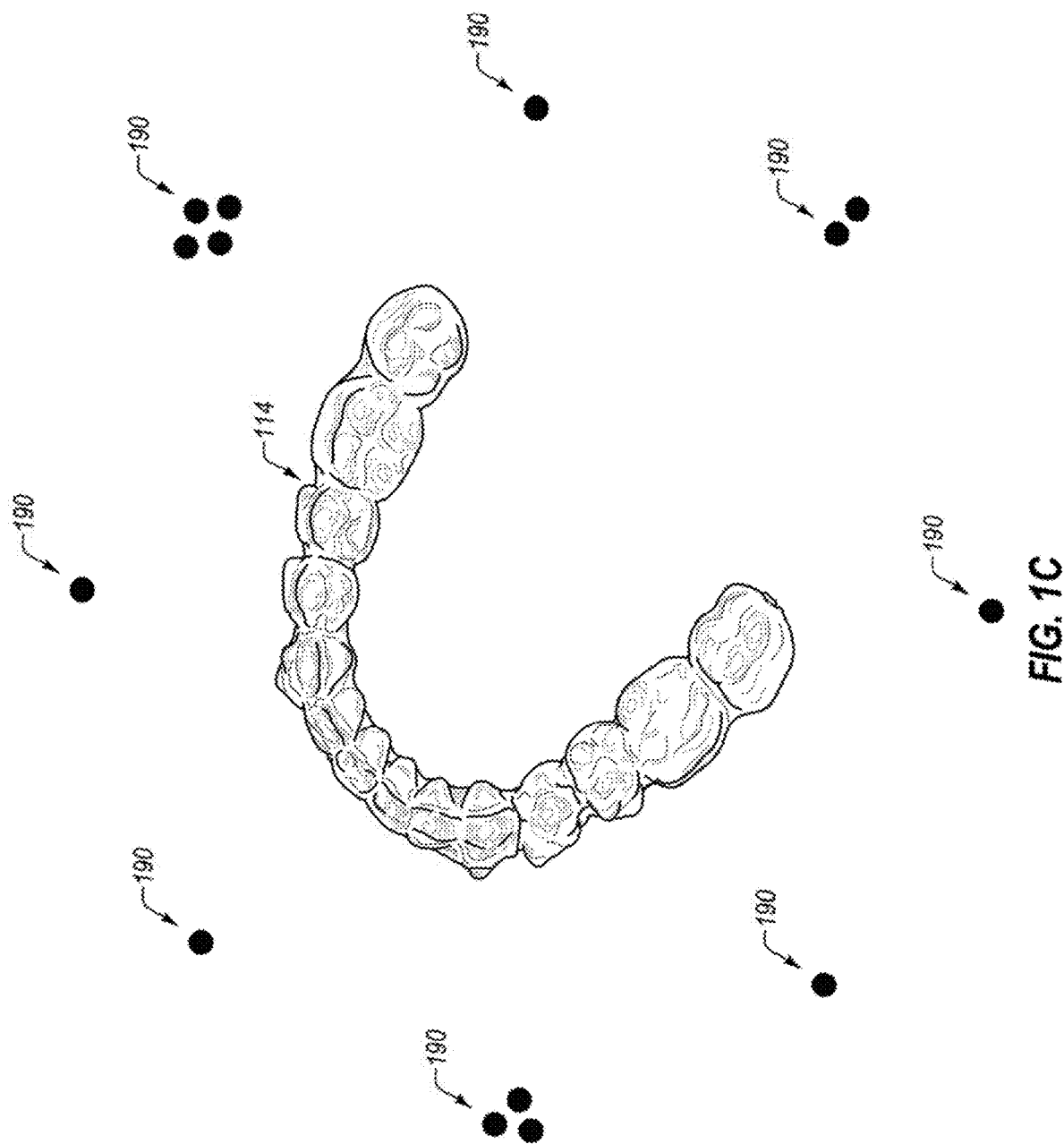

AUTOMATED QUALITY CONTROL FOR THREE-DIMENSIONAL (3D) PRINTED MOLD FOR ORTHODONTIC ALIGNER

RELATED APPLICATIONS

The present application is a continuation of U.S. patent application Ser. No. 16/685,848 filed Nov. 15, 2019, which claims the benefit of U.S. Provisional Patent Application No. 62/768,770, filed Nov. 16, 2018, entitled "MACHINE BASED THREE-DIMENSIONAL (3D) PRINTED OBJECT DEFECT DETECTION," both of which are incorporated by reference herein.

TECHNICAL FIELD

The present disclosure relates to the field of manufacturing custom products and, in particular, to detecting defects within the internal volume, on the surface, and on the interface of customized, three-dimensional (3D) printed products, as well as detecting defects on shells formed over 3D printed objects.

BACKGROUND

For some applications, customized products may be fabricated using three-dimensional (3D) printing systems and methods. 3D printed products may contain various defects resulting from imperfections of the fabrication machine or the surrounding environment. Defects may be caused, for example, by vibrations, air bubbles trapped in resin, laser power fluctuations and/or other machine dependent factors.

Defects within the internal volume of a 3D printed object, defects on a surface of a 3D printed object and defects at a surface to interior volume interface of a 3D printed object can all render 3D printed objects unsuitable for their intended purpose. The standard technique to detect such defects is through manual inspection or examination by a person. However, this examination procedure is highly subjective and frequently results in a high number of both false positive determinations of defects, and false negative determinations of defects. As a result, 3D printed objects without significant defects are either thrown out or repurposed, and 3D printed objects with significant defects are overlooked, which may cause the 3D printed object to malfunction or break during use.

Additionally, 3D printed molds may be used to form shells such as orthodontic aligners. Such shells may be formed (e.g., thermoformed) over the 3D printed molds. Such shells are also subject to defects, which may include defects transferred from the 3D printed molds.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 1C illustrates a dot pattern around a 3D object, in accordance with an embodiment.

DETAILED DESCRIPTION OF THE DRAWINGS

Figure 1A:
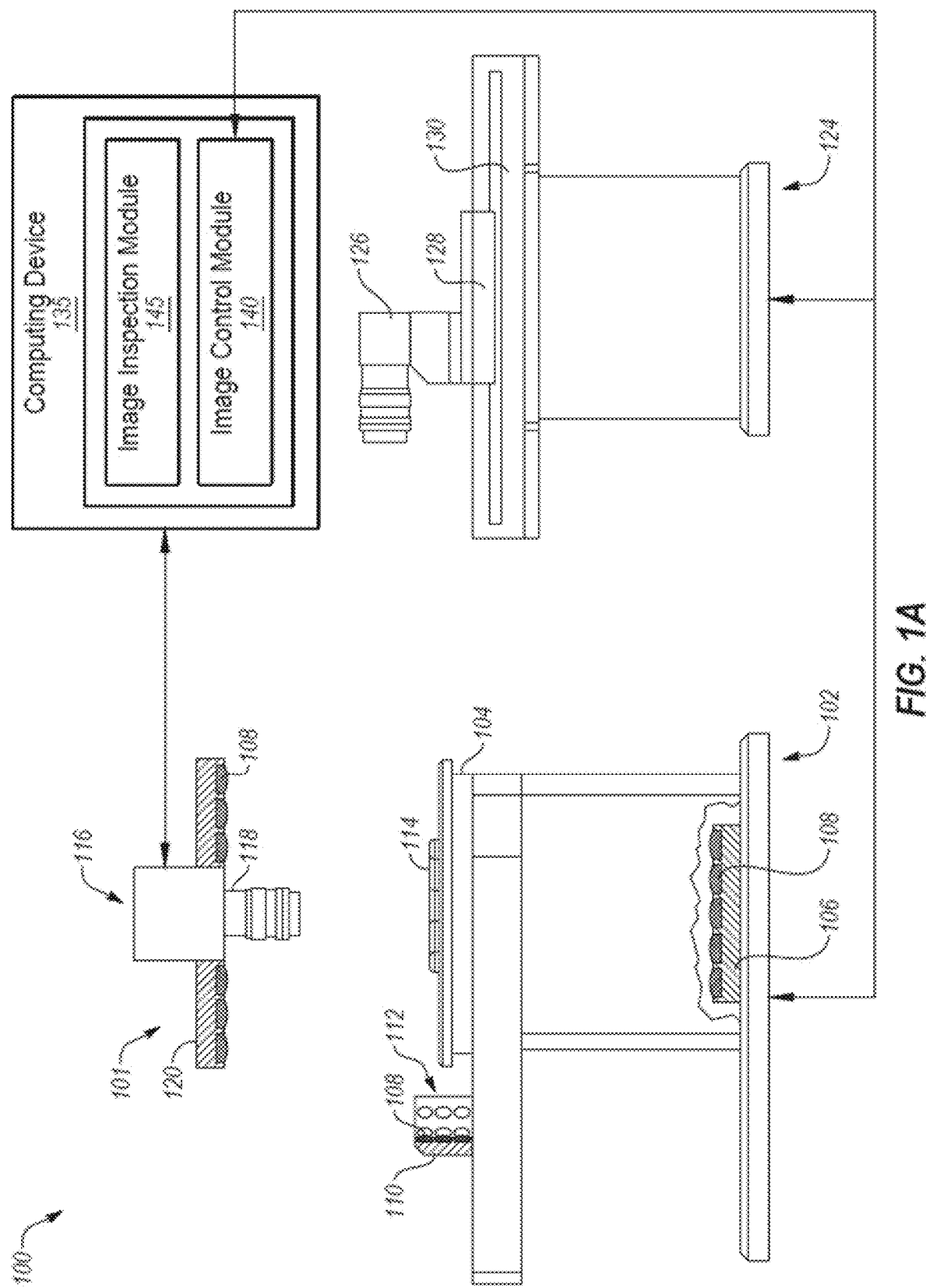
FIG. 1A illustrates one embodiment of an imaging defect detection system that performs automated defect detection of three-dimensional (3D) printed objects and/or shells, in accordance with one embodiment.

Described herein are embodiments covering systems, methods, and/or computer-readable media suitable for machine based defect detection of defects in three-dimensional (3D) printed objects. The 3D printed objects may be any type of 3D printed object, one example of which are customized medical devices. For example, in some embodiments, machine based defect detection systems and methods may be implemented in the inspection of molds for orthodontic or polymeric aligners prior to the manufacturing of orthodontic or polymeric aligners. In other embodiments, machine based defect detection systems and methods may be implemented in the inspection of orthodontic or polymeric aligners manufactured by direct fabrication. In other embodiments, machine based defect detection systems and methods may be implanted in the inspection of shells formed over 3D printed objects (e.g., over 3D printed molds). For example, the 3D printed objects may be 3D printed molds of dental arches, and shells such as orthodontic aligners or other orthodontic appliances may be formed over the 3D printed molds. The shells may be removed from the 3D printed molds, and then processed by the machine based defect detection systems described herein to determine defects in the shells.

In some embodiments, a 3D printed object may be fabricated using additive manufacturing techniques (also referred to herein as "3D printing"). To manufacture the 3D printed object, a shape of the object may be determined and designed using computer aided engineering (CAE) or computer aided design (CAD) programs. In some instances, stereolithography (SLA), also known as optical fabrication solid imaging, may be used to fabricate the 3D printed object. In SLA, the object is fabricated by successively printing thin layers of a photo-curable material (e.g., a polymeric resin) on top of one another. A platform rests in a bath of liquid photopolymer or resin just below a surface of the bath. A light source (e.g., an ultraviolet laser) traces a pattern over the platform, curing the photopolymer where the light source is directed, to form a first layer of the object. The platform is lowered incrementally, and the light source traces a new pattern over the platform to form another layer of the object at each increment. This process repeats until the object is completely fabricated. Once all of the layers of the object are formed, the object may be cleaned and cured.

In some embodiments, 3D printed objects may be produced using other additive manufacturing techniques. Other additive manufacturing techniques may include: (1) material jetting, in which material is jetted onto a build platform using either a continuous or drop on demand (DOD) approach; (2) binder jetting, in which alternating layers of a build material (e.g., a powder-based material) and a binding material (e.g., a liquid binder) are deposited by a print head; (3) fused deposition modeling (FDM), in which material is drawn through a nozzle, heated, and deposited layer by layer; (4) powder bed infusion, including but not limited to direct metal laser sintering (DMLS), electron beam melting (EBM), selective heat sintering (SHS), selective laser melting (SLM), and selective laser sintering (SLS); (5) sheet lamination, including but not limited to laminated object manufacturing (LOM) and ultrasonic additive manufacturing (UAM); and (6) directed energy deposition, including but not limited to laser engineering net shaping, directed light fabrication, direct metal deposition, and 3D laser cladding.

In some embodiments, a 3D printed object may include a mold for an orthodontic and/or polymeric aligner. The mold may have the shape of a patient's dental arch and an aligner may be formed over the mold. To manufacture the mold, a shape of the dental arch for the patient at a treatment stage may be determined based on a custom treatment plan. In the example of orthodontics, the treatment plan may be generated based on an intraoral scan of a dental arch to be modeled. The intraoral scan may be performed to generate a 3D virtual model of the patient's dental arch. In some instances, SLA techniques may be used to fabricate the mold of the patient's dental arch in accordance with the description above.

An aligner may be formed from each mold of the patient's dental arch. In one embodiment, a sheet of material is pressure formed or thermoformed over the mold. To thermoform the aligner over the mold, the sheet of material may be heated to a temperature at which the sheet becomes pliable. Pressure may concurrently be applied to the sheet to form the now pliable sheet around the mold. In some embodiments, vacuum is applied to remove trapped air and pull the sheet onto the mold along with pressurized air to form the sheet to the detailed shape of the mold. Once the sheet cools, it will have a shape that conforms to the mold.

If the mold contains defects within its internal volume, on its surface, or on its interface, those defects may be transferred to the later formed aligner. For example, a gap may exist between one or more thin layers of the mold as a result of a malfunction of the mold manufacturing process, causing air to become trapped within that gap. When vacuum is applied to remove trapped air during aligner manufacture, the air trapped in the gap between the thin layers of the mold may be removed and the thin layers may be forced together, closing the gap when pressure is applied to the plastic sheet. This type of defect is referred to herein as an "internal volume defect." Internal volume defects may cause a deformation of the mold of the patient's dental arch during thermoforming of the aligner, which may be transferred to the aligner formed over the deformed mold. In another example, particles (e.g., debris), may form or collect on the surface of the mold. The shape of the particles may transfer to the aligner during the thermoforming process. This type of defect is referred to herein as a "surface defect." In a further example, holes (e.g., pits) may form at the interface of the internal volume and the surface of the mold. The shape of the holes may transfer to the aligner during the thermoforming process. This type of defect is referred to herein as an "interface defect."

Internal volume defects, surface defects, interface defects, and other defects caused during fabrication of 3D printed objects may be referred to herein as "layering defects." Layering defects may also include printed layers with abnormal layer thickness (e.g., layers with a thickness that exceeds a layer thickness threshold) and delamination between printed layers. In some embodiments, a layering defect transferred to an aligner may cause a patient using the aligner to experience discomfort. In further embodiments, a layering defect transferred to the aligner may cause an aligner to fail to impart planned forces on a patient's teeth. In further embodiments, a layering defect transferred to an aligner may cause the aligner to fail to properly fit a patient's dental arch. It should be noted that, while layering defects may be present in a mold of a dental arch used to form an orthodontic or polymeric aligner, these defects may also be present in any type of 3D printed object, in accordance with any fabrication technique described herein and/or any other 3D printing technique.

In other embodiments, an orthodontic and/or polymeric aligner may be manufactured via direct fabrication. Direct fabrication may include additive manufacturing techniques described above, or subtractive manufacturing techniques (e.g., milling). In some embodiments, direct fabrication involves forming an object (e.g., an orthodontic or polymeric aligner or a portion thereof) without using a physical template (e.g., mold, mask, etc.). In some embodiments, direct fabrication methods build up the object geometry in a layer-by-layer fashion, with successive layers being formed in discrete build steps. Alternatively or in combination, direct fabrication methods that allow for continuous buildup of an object geometry can be used. Other direct fabrication methods allowing for the buildup of object geometry in a layer-by-layer fashion may also be used.

Layering defects (e.g., internal voids, pits at a surface to interior volume interface, surface debris, layers with a thickness that deviates from a target layer thickness, delamination of layers, etc.) may form in an aligner formed by direct fabrication techniques. In some embodiments, a layering defect on the aligner may result in a patient using the aligner to experience discomfort, may cause the aligner to fail to impart planned forces on a patient's teeth, and/or may cause the aligner to fail to properly fit a patient's dental arch.

As mentioned above, some embodiments of the present disclosure may detect various manufacturing defects (e.g., layering defects) in 3D printed objects (e.g., for a given set of molds, or a given set of aligners). The manufacturing defects may include gross defects, as well as layering defects. Gross defects may include one or more of arch variation, deformation, bend (compressed or expanded) of molds or aligners, cutline variations, webbing, trimmed attachments, missing attachments, burrs, flaring, power ridge issues, material breakage, short hooks, and so forth. Detection of the manufacturing defects may enable fixing the mold or aligner to remove the defect, preventing the shipment of a deformed or subpar aligner, and/or remanufacture of the deformed or subpar mold or aligner prior to shipment.

It should be noted that "aligner", "appliance" and "shell" may be used interchangeably herein. Some embodiments are discussed herein with reference to molds for orthodontic and/or polymeric aligners and to orthodontic and/or polymeric aligners (also referred to simply as aligners). However, embodiments also extend to other types of molds, such as molds for orthodontic retainers, orthodontic splints, sleep appliances for mouth insertion (e.g., for minimizing snoring, sleep apnea, etc.) and/or molds for non-dental applications. Embodiments may also extend to other types of shells formed over molds, such as orthodontic retainers, orthodontic splints, sleep appliances for mouth insertion, etc. Other applications of the present disclosure may be found when inspecting 3D printed palatal expanders, removable mandibular repositioning devices, and removable surgical fixation devices. Additionally, embodiments also extend to any type of 3D printed objects. Accordingly, it should be understood that embodiments herein that refer to molds and aligners also apply to other types of dental appliances. Additionally, the principles, features and methods discussed may be applied to any application or process in which it is useful to perform machine based defect detection for any suitable type of 3D printed objects (e.g., customized devices, such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other athletic/protective devices).

Furthermore, while embodiments are discussed herein with reference to performing automated image quality control of 3D printed objects. Embodiments also apply to performing automated image quality control of shells formed over 3D printed objects (e.g., to polymeric aligners thermoformed over 3D printed molds of dental arches).

In one embodiment, a method of performing automated quality control of a 3D printed object includes providing a first illumination of the 3D printed object using a first light source arrangement. A plurality of images of the 3D printed object are generated under the first illumination using one or more imaging devices, wherein each image of the plurality of images depicts a distinct region of the 3D printed object. The plurality of images are processed by a processing device using a machine learning model trained to identify one or more types of manufacturing defects of a 3D printing process, wherein an output of the machine learning model comprises, for each type of manufacturing defect, a probability that an image comprises a defect of that type of manufacturing defect. The processing device then determines, without user input, whether the 3D printed object comprises one or more manufacturing defects based on a result of the processing.

In one embodiment, a method of performing automated quality control of a 3D printed object includes obtaining, by a processing device, an image of a three-dimensional (3D) printed object. The processing device performs edge detection on the image to determine a boundary of the 3D printed object in the image. The processing device selects a set of points on the boundary. The processing device determines an area of interest using the set of points, wherein the area of interest comprises a first region of the image that depicts the 3D printed object within the boundary. The processing device crops the image to exclude a second region of the image that is outside of the area of interest. The processing device processes the cropped image using a machine learning model trained to identify manufacturing defects of a 3D printing process, wherein an output of the machine learning model comprises a probability that the 3D printed object in the image comprises a manufacturing defect. The processing device then determines whether the 3D printed object depicted in the image comprises a defect from the output.

In one embodiment, a defect detection system of three-dimensional (3D) printed objects includes a multi-axis platform to support a 3D printed object, a plurality of light sources to illuminate the 3D printed object, a computing device, and one or more imaging devices to generate a plurality of images of the 3D printed object from a plurality of rotation and/or translational motion settings of the multi-axis platform, wherein each image of the plurality of images depicts a distinct region of the 3D printed object. The computing device processes the first plurality of images using a machine learning model trained to identify manufacturing defects of a 3D printing process, wherein an output of the machine learning model comprises a probability that an image comprises a manufacturing defect. The computing device further determines, without user input, whether the 3D printed object comprises one or more manufacturing defects based on a result of the output of the machine learning model.

Traditionally, 3D printed parts are inspected manually for quality control. Such manual inspection is highly subjective and frequently results in a high number of both false positive determinations of defects, and false negative determinations of defects. Additionally, there is often little consistency between inspectors. As a result, 3D printed objects without significant defects are either thrown out or repurposed, and 3D printed objects with significant defects are overlooked. The automated image-based quality control system and techniques described in embodiments are more accurate and more uniform than traditional manual inspection of 3D printed parts. Accordingly, false positive determinations of defects and false negative determinations of defects may be reduced or eliminated in embodiments. Additionally, the consistency of quality in 3D printed parts may be increased.

Various software and/or hardware components may be used to implement the disclosed embodiments, as shown in FIGS. 1A, 1B, 2A, 2B and 11. For example, software components may include computer instructions stored in a tangible, non-transitory computer-readable media that are executed by one or more processing devices to perform machine based defect detection of 3D printed objects, such as aligners or molds for aligners. The software may setup and calibrate cameras included in the hardware components, capture images of 3D printed objects from various angles using the cameras, setup and calibrate light source arrangement included in the hardware components, provide illumination arrangements to properly illuminate the 3D printed object while images are captured, perform analysis that compares a digital model of the 3D printed object with the image of the 3D printed object to detect one or more gross defects (e.g., deformation, cutline variation, etc.), and/or perform automated analysis that identifies fine defects such as layering defects in the 3D printed object using a trained machine learning model.

Referring now to the figures, FIG. 1A illustrates one embodiment of a defect detection system 100 that performs automated defect detection of a 3D object 114, in accordance with one embodiment. In one embodiment, the 3D object 114 is a 3D printed object. In one embodiment, the 3D object 114 is a shell that was formed over a 3D printed object, and then optionally removed therefrom. The defect detection system 100 may include an imaging system 101 and a computing device 135. The imaging system 101 may include a platform apparatus 102, a top view camera apparatus 116, and/or a side view camera apparatus 124. The platform apparatus 102, top view camera apparatus 116 and/or side view camera apparatus 124 may be connected to computing device 135 via a wired or wireless connection. The computing device 135 may include an imager control module 140, which may send instructions to the platform apparatus 102, top view camera apparatus 116 and/or side view camera apparatus 124 to cause the defect detection system 100 to capture images of one or more regions of a 3D object 114 disposed on the platform apparatus 102. The captured images may be sent to the computing device 135, and an image inspection module 145 on the computing device 135 may analyze the images of the 3D object 114 to determine whether any manufacturing defects (e.g., gross defects, layering defects, etc.) are present in the 3D object 114.

The platform apparatus 102 may include a platform 104. The 3D object 114 may sit on the platform 104 while images of the 3D printed object are captured and subsequently processed by a processing logic. In one embodiment, the platform 104 may be a multi-axis platform. In one embodiment, the multi-axis platform includes an x-y-z-θ control, allowing the platform 104 to move along 4 axes of motion. Alternatively, the multi-axis platform may include fewer degrees of control (e.g., a θ control that causes the multi-axis platform to rotate around a z-axis). The 3D object 114 may be secured in a stationary position by a part holder (not shown) in some embodiments. Alternatively, the 3D object 114 may rest on the platform 104 without use of a part holder. Imager control module 140 may send instructions to platform apparatus 102 to set a motion setting of the platform 104 and cause the platform 104 (and the 3D printed object disposed thereon) to move along or around at least one axis of motion (e.g., rotation and/or translational motion in the x, y, and/or z axes). In some embodiments, the platform 104 is rotated continuously while images are generated. Alternatively, the platform 104 may be rotated to a target orientation, and then rotation may be stopped while one or more images are generated.

The platform apparatus 102 may further include one or more light sources. The light sources may include a first light source 106 disposed beneath the platform 104, which may include a first set of one or more light emitting elements 108. Each light emitting element 108 may include at least one of an incandescent light bulb, a fluorescent light bulb, a light-emitting diode (LED), a neon lamp, and so forth. In one embodiment, the one or more of the light emitting elements 108 may emit full spectrum light. In one embodiment, one or more of the light emitting elements 108 may emit light of a particular wavelength or spectrum. For example, light emitting elements 108 may emit, red light, blue light, green light, infrared light, ultraviolet light, and so on. First light source 106 may include light emitting elements 108 that emit various different wavelengths or spectrums of light in embodiments. For example, some light emitting elements 108 may emit infrared light, while other light emitting elements may emit full spectrum light. In one embodiment, the platform 104 maybe composed of a transparent material, allowing illumination from the first light source 106 below the platform to pass through the platform 104 and provide illumination of a bottom of the 3D object 114 from underneath the 3D object 114.

The platform apparatus 102 may further include a backing plate 110. The 3D object 114 may be disposed between the side view camera apparatus 124 and the backing plate 110. The backing plate 110 may facilitate images of the 3D object 114 with adequate contrast and/or lighting conditions. The backing plate 110 may include a second light source 112, wherein the second light source 112 may include a second set of one or more light emitting elements 108. The second light source 112 may provide illumination to at least one side of the 3D object 114. Second light source 112 may include light emitting elements 108 that emit various different wavelengths or spectrums of light in embodiments. For example, some light emitting elements 108 may emit infrared light, while other light emitting elements may emit full spectrum light. In one embodiment, backing plate 110 has a curved shape with a concave face that faces the platform 104 and 3D object 114 disposed thereon.

A third light source 120 may be disposed over the platform 104, and may provide illumination on a top of the 3D object 114. The third light source 120 may include a third set of one or more light emitting elements 108. Third light source 120 may include light emitting elements 108 that emit various different wavelengths or spectrums of light in embodiments. For example, some light emitting elements 108 may emit infrared light, while other light emitting elements may emit full spectrum light. In one embodiment, third light source 120 is a component of top view camera apparatus 116. Alternatively, third light source 120 may be a separate component, which may be connected to computing device 135.

In one embodiment, one or more of the first light source 106, second light source 112 and/or third light source 120 are components of a smart lighting system. The smart lighting system may be controlled by imager control module 140, which may determine a target illumination for the 3D object 114 and activate one or more light emitting elements 108 of the first light source 106, second light source 112 and/or third light source 120 to achieve the target illumination. Additionally, the smart lighting system may adjust an intensity of one or more of the light emitting elements. The light emitting elements 108 in the first light source 106, second light source 112 and/or third light source 120 may be arranged in a pattern (e.g., as a grid of light emitting elements), and each light emitting element may provide illumination of the 3D printed object from a particular angle. Additionally, or alternatively, one or more of the light emitting elements 108 in the first light source 106, second light source 112 and/or third light source 120 may be moveable, and may be positioned to achieve light from a target angle. The imager control module 140 may determine a target illumination based on a size of the 3D printed object, shapes of the 3D object 114, a material that the 3D printed object is composed of, and so on. The target illumination may cause a target region of the 3D object 114 that will be imaged to be illuminated, with minimal or no shadows occluding features of the 3D object 114. The imager control module 140 may also cause the first light source 106, second light source 112 and/or third light source 120 to cycle through different illumination settings until an adequate or optimal illumination setting is identified for a particular 3D object 114.

In some embodiments, dark-field illumination is used, where a black or otherwise dark background may be placed behind the 3D object 114 (or behind a shell or aligner). Alternatively, bright-field illumination may be used, where the 3D object 114 (or shell or aligner) is placed between a camera and a bright light source. In some embodiments, one or more of the first light source 106, second light source 112 and/or third light source 120 comprises a variable aperture. This may facilitate reading of a laser marking on the 3D printed object (or shell or aligner).

The top view camera apparatus 116 may include a top view camera 118 that is configured to capture images of the 3D object 114. The top view camera 118 may include a high definition camera in one embodiment. In some embodiments, the top view camera apparatus 116 may include one or more cameras that capture a wide field of view of the 3D printed object. The top view camera 118 may be a two-dimensional camera or a 3D camera (e.g., a pair of cameras that generate a stereo image pair, a camera and associated structured light projector that shines a structured light pattern onto the 3D object 114, and so on). The top view camera 118 may be configured to acquire top view images of the 3D object 114 using certain illumination settings to enable the 3D object 114 to be visible in a top view image. In one embodiment, the top view camera 118 has a fixed position. Alternatively, the top view camera 118 may be a moveable camera. For example, the top view camera 118 may be moveable in the x, y and z directions and/or may rotate about one or more axes. Imager control module 140 may send instructions to top view camera apparatus 116 to set a zoom setting of the top view camera 118, to set an angle of the top view camera 118, to set a position of the top view camera 118, and so on. Instructions from the imager control module 140 may also cause the top view camera 118 to generate one or more images of the 3D object 114.

The side view camera apparatus 124 may include a side view camera 126 that is configured to capture images of the 3D object 114. The side view camera 126 may be a two-dimensional camera or a 3D camera (e.g., a pair of cameras that generate a stereo image pair, a camera and associated structured light projector that shines a structured light pattern onto the 3D object 114, and so on). In one embodiment, the side view camera is a high resolution camera and/or a high speed camera (e.g., capable of capturing an image up to every millisecond. The side view camera 126 may acquire multiple images of different regions of the 3D object 114 by moving (e.g., by rotation and/or translational motion) the 3D printed object using the multi-axis platform, which may be directed via the x-y-z-θ controls, and generating images at different rotation and/or translational motion settings of the multi-axis platform The side view camera 126 may be attached to a moveable base 128. Alternatively, the side view camera may be at a fixed position, or may be on a different type of base (which may or may not be movable). The moveable base 128 may allow the side view camera 126 to move towards and away from the 3D object 114, thus allowing the side view camera 126 to capture images of the 3D object 114 from different perspectives. The moveable base 128 may be connected to a platform 130, which guides the moveable base 128 towards and away from the 3D object 114. In one embodiment, the platform 104 (and 3D object 114 disposed thereon) may be stationary, and the side view camera 126 may be movable around the platform 104 (e.g., on a track that wholly or partially circumscribes the platform 104). In one embodiment, the platform 104 is a multi-axis platform and the side view camera 126 is movable around the platform 104. In one embodiment, the side view camera 126 may capture multiple images and/or a video of the 3D object 114 as it moves with the platform 104. The video may include multiple frames, where each frame may be an image of a distinct region of the 3D printed object. Imager control module 140 may send instructions to side view camera apparatus 124 to set a zoom setting of the side view camera 126, to set an angle of the side view camera 126, to set a position of the side view camera 126, and so on. Instructions from the imager control module 140 may also cause the side view camera 126 to generate one or more images of the 3D object 114.

Image control module 140 may cause the top view camera 118 and/or side view camera 126 to capture images of the 3D object 114. Image control module 140 may then receive the images and process the images according to the methods shown in FIGS. 3A-6. In one embodiment, a first illumination may be provided to the 3D object 114 by at least one of the first light source 106, the second light source 112, and/or the third light source 120. One or light emitting elements 108 of the first, second, or third list sources 106, 112, 120 may be activated at the same time, while one or more other light emitting elements 108 may not be activated, to provide the first illumination.

The image control module 140 may control which light emitting elements 108 of the first, second, and/or third light sources 106, 112, 120 are activated and which light emitting elements 108 are not illuminated, as well as the intensities of the various activated light emitting elements, to provide the first illumination. In one embodiment, the 3D printed object 113 may include a part identifier (ID), case ID, patient ID and/or other ID printed on or otherwise displayed thereon.

In some embodiments, one or more of the light sources 106, 112, 120 is a variable aperture light source with at least two aperture settings. In one embodiment, the first light source 106 has a first aperture setting of about 130 degrees (e.g., around 100-160 degrees) and a second aperture setting of about 40 degrees (e.g., about 20-60 degrees). The first aperture may be used to obtain images for reading a laser marking in the 3D object 114, because at this lighting condition laser markings may have good contrast (while a contour of the 3D printed object or shell or aligner may not have good contrast). The second aperture may be used for imaging used for defect detection, because the contrast of contours may be much better at the second aperture.

The aperture can be changed either by moving the first light source 106 up and down or by splitting it in two parts. If the light source 106 is split into multiple parts, the first part and second part may be placed apart from one another with a particular angle of orientation between them. Each part may include one or more light emitting elements 108. For example, the first part may be placed with an orientation such that an axis of the first part is approximately parallel with an axis of the top view camera 118. The second part may be offset from the first part, and may be oriented such that an axis of the second part is at about a 50-80 degree angle (e.g., a 65 degree angle) to the axis of the top view camera 118 and to the axis of the first part. To generate an image that will enable the contours of the 3D printed object (or the contours of the shell or aligner) to be determined, the first part may be activated without activating the second part (causing a low aperture illumination). To generate an image that will enable the laser marking to be read, the first and second parts may both be activated (causing a high aperture illumination). In some embodiments, the second part may include multiple light emitting elements 108 that are on three sides of the 3D printed object (or shell or aligner) that is to be illuminated so that it doesn't obstruct the side camera field of view.

A first image of the 3D object 114 may be generated by at least one camera, such as the top view camera 118, and may include an image of the ID. The first image may include a symbol sequence displayed on a distinct region on the 3D object 114.

In one embodiment, the first image of the 3D object 114 may be generated by the top view camera apparatus 116 while the first light source 106 is set to provide a wide light field. The laser marking may provide an identification of a particular 3D printed object (or of a particular shell or aligner), and may correspond to a particular digital model of the 3D printed object (or of the shell or aligner). The image control module may perform optical character recognition (OCR) on the symbol sequence to determine the ID. In other embodiments, a technician may manually enter the ID associated with the 3D printed object at an inspection station using an interface, such as the user interface (UI) illustrated in FIG. 9. In other embodiments, the ID may be obtained based on a known order and/or position of the 3D printed object in object sorting system. For example, a robotic object sorting system may retrieve 3D printed objects and place them at a particular position in a staging area. A robotic arm may then retrieve the 3D printed object from the staging area, and may determine the ID associated with the 3D printed object based on the position of the 3D printed object in the staging area. The determined ID may then be sent to the computing device 135.

The imager control module 140 may associate images of the 3D object 114 with the determined ID. In one embodiment, the processing logic may determine a digital file associated with the ID. The digital file may include one or more properties associated with the 3D object 114. In one embodiment, a first property may include a geometry associated with at least one surface of the 3D object 114. In another embodiment, a second property may include the composition of the 3D object 114. The digital file may further include a light source arrangement associated with at least one of the first property and the second property. The processing logic may cause one or more light emitting elements 108 to be activated and one or more additional light emitting elements 108 to not be activated based on the light source arrangement associated the first property and/or the second property. For example, the first property may include a shape of the 3D object 114 (e.g., as depicted in a 3D virtual model of the 3D printed object), and the image control module 140 may determine an arrangement of light sources 106, 112, 120 that will illuminate the 3D object 114 without casting shadows on portions of the 3D object 114 being imaged. In another example, the second property may be a material of the 3D object 114, which may indicate a range of wavelengths of light for which the material is transparent or translucent, and image control module 140 may cause one or light emitting elements 108 to emit light in range of wavelengths for which the material is transparent or translucent. For example, the imager control module 140 may cause one or more light sources 106, 112, 120 to emit a wavelength associated with blue light (e.g., 450-495 nm) if the 3D object 114 is composed of nylon (which is transparent for blue light).

A plurality of images may be generated by at least one imaging device (e.g., the top view camera 118 or the side view camera 126). In one embodiment, an image is generated by the top view camera 118 while the first light source 106 is set to provide a narrow light field. The image may then be used to determine contours of the 3D printed object (or of the shell or aligner). In one embodiment, a plurality of images may be generated by the side view camera 126. Each image of the plurality of images may depict a distinct region of the 3D object 114. In one embodiment, while the side view images are generated, light source 112 may be activated and light source 106 may be deactivated. In some embodiments, a camera lens diaphragm is contracted (at least partially closed) during generation of one or more of the side view images to achieve a large focus depth. This can facilitate obtaining a sharp picture in a side projection at large angle with vertical.

In one embodiment, the digital file may further include a motion profile associated with at least one property included in the digital file. The imager control module 140 may determine a degree, velocity, or acceleration of the rotation and/or translational motion of the platform 104 on the platform apparatus 102 while images are captured, in accordance with the motion profile. The imager control module 140 may determine the location, velocity, or acceleration of the moveable base 128 on the side view camera apparatus 124 while images are being captured, in accordance with the motion profile.

In some embodiments, a reference object may be used to determine a rotation angle and/or a position in space of the 3D printed object (or shell or aligner) for each image. The reference object may be a circular pattern of dots 190 surrounding the 3D object 114, for example, as shown in FIG. 1C. The number of dots and the circle diameter may be selected such that at least four dots are always in the top camera field of view and the 3D object 114 rarely covers a dot in the side view. Knowing the position of four dots or more, one can determine the camera position by a standard technique used in camera calibration. Also there may be some dots marked with additional dots of the same or smaller size outside the circle. This will allow to determine the rotation angle exactly. A round dot is an object that can be detected on an image quickly and reliably.

Referring back to FIG. 1A, once computing device 135 receives an image of the 3D object 114, the image may be processed by image inspection module 145. Image inspection module 145 may determine whether a received image is processable. In one embodiment, image inspection module 145 determines whether a contrast depicted in the first image is sufficient to enable further image processing operations (e.g., edge detection, processing by a trained machine learning model, etc.) to be performed. In one embodiment, image inspection module 145 determines a contrast metric for the image, and determines whether the contrast metric exceeds a contrast threshold. If the contrast metric is below the contrast threshold, the processing logic may determine the image is not processable. If the contrast metric exceeds the contrast threshold, image inspection module 145 may determine that the image is processable, and the image inspection module 145 may process the image using a trained machine learning model to determine whether a manufacturing defect (e.g., a gross defect, layering defect, etc.) is present within the region of the 3D object 114 represented in the image. In one embodiment, different machine learning models are used for 3D printed objects than for shells.

If the image inspection module 145 determines that the image is not processable, the imager control module 140 may cause a second image of the same distinct region of the 3D object 114 depicted in the first image to be generated. Imager control module 140 may determine a second illumination to be used on the 3D object 114 by at least one of the first light source 106, the second light source 112, and/or the third light source 120 for the second image. The second illumination may be selected so as to provide a different light pattern, shadow pattern and/or contrast on the 3D object 114 than was provided by the first illumination.

In one embodiment, the processing logic may cause one or more light emitting elements 108 that were not activated for the first illumination to be activated for the second illumination. Alternatively, or additionally, the processing logic may adjust the intensity of one or more light emitting elements that were previously activated.

In one embodiment, the imager control module 140 may comprise a trained machine learning module (e.g., an artificial neural network, deep neural network, etc.) that has been trained to determine an optimal illumination for a region of a 3D object 114 (e.g., settings for one or more light sources) based on an input of a shape of the 3D object 114 (e.g., a virtual 3D model of the 3D object 114 and/or 2D image of the 3D object 114), and/or an angle and/or position of a camera relative to the 3D object 114. The trained machine learning model may have been trained using a training dataset, where each data item in the training dataset may include a) a 2D image or a virtual 3D model and camera angle, b) settings for one or more light sources 106, 112, 120, and c) an indication of sufficient illumination or insufficient illumination. The 3D model of the 3D object 114 and a rotation and/or translational motion setting of the platform 104 and/or camera position setting of the side view camera 126 may be input into the trained machine learning module, which may output settings for the one or more light sources 106, 112, 120 (e.g., indications of which light emitting elements 108 in each of the light sources 106, 112, 120 to activate). Alternatively, an image that was determined to have insufficient contrast may be input into the trained machine learning module.

A second image may then be generated by at least one imaging device (e.g., the top view camera 118 or the side view camera 126). In one embodiment, the second image may depict the same distinct region of the 3D object 114 that was depicted in the first image that was determined to be unprocessable. In another embodiment, the second image may depict a different distinct region of the 3D object 114 than was depicted in the first image. In one embodiment, the trained machine learning module is used to determine an optimal illumination for one or more images of the 3D object 114 before any images are determined to be unprocessable.

In one embodiment, once an image is determined to be processable, that image may be input into a trained machine learning module of the image inspection module 145 that has been trained to identify defects in images of 3D printed objects or shells. In one embodiment, a separate operation is not performed to determine whether an image is processable prior to inputting the image into the machine learning model trained to identify defects. Instead, the machine learning model may output a confidence value along with an indication of whether or not a defect has been identified (and/or a type of defect that has been identified). If the confidence value is below a confidence threshold, then a new illumination may be determined and a second image of the region depicted in the first image may be generated using the new illumination. The second image may then be processed by the machine learning model. The machine learning model that identifies defects in 3D printed objects is discussed in greater detail below.

Figure 1B:
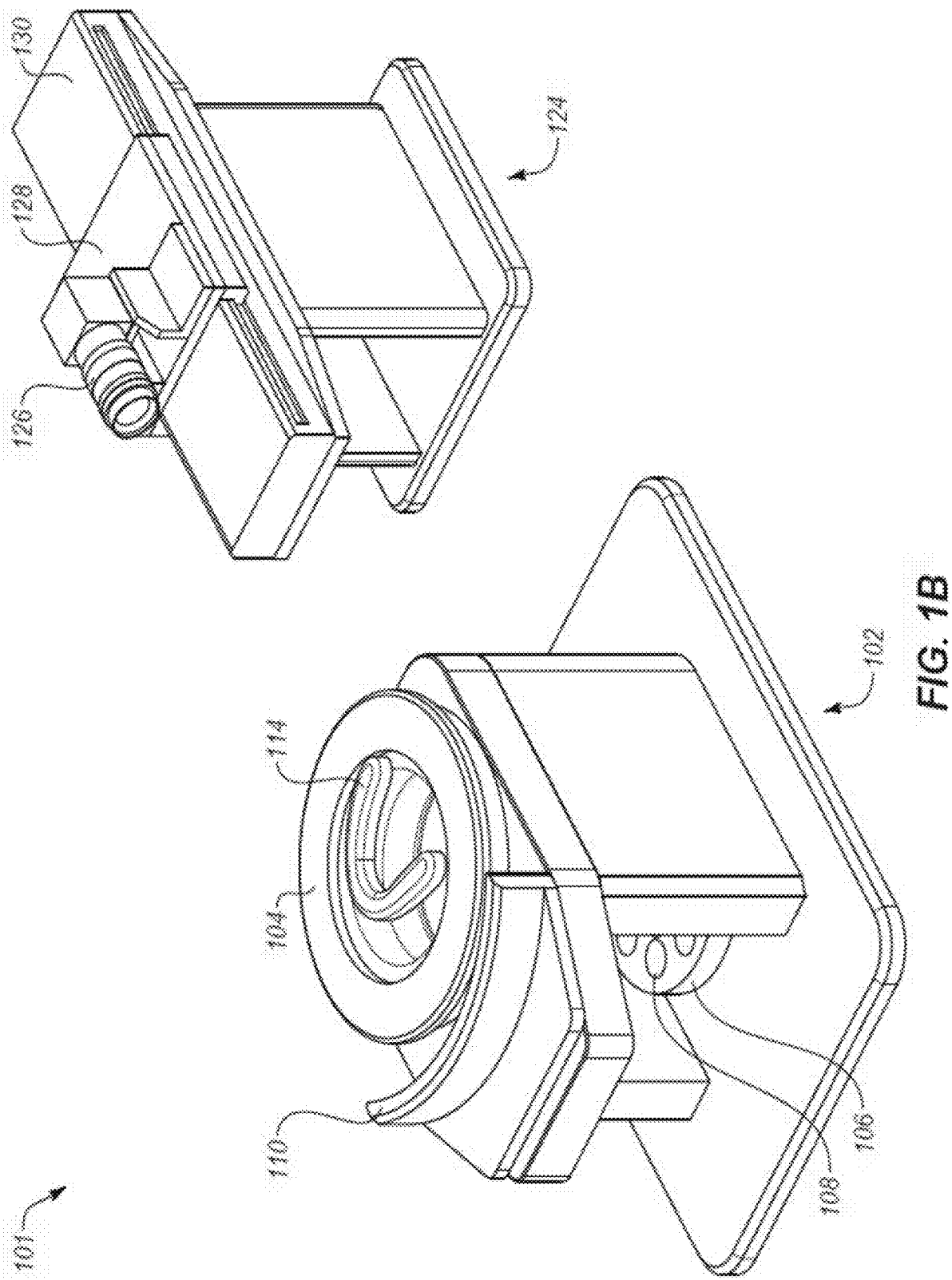
FIG. 1B illustrates a 3D view of one embodiment of an imaging system that captures images of 3D printed objects and/or shells, in accordance with one embodiment.

FIG. 1B illustrates a 3D view of one embodiment of an imaging system 101 that captures images of a 3D object 114 (e.g., a 3D printed object or shell), in accordance with one embodiment. The imaging system 101 may include platform apparatus 102 and side view camera apparatus 124. The imaging system 101 may also include top view camera apparatus 116, which is not shown in FIG. 1B. The imaging system 101 may be used to capture images of a 3D object 114 being analyzed to determine whether a manufacturing defect is present in the 3D object 114 (e.g., a gross defect, a layering defect, etc.). In the illustrated embodiment, the 3D object 114 is a mold of a dental arch that will be used to form an aligner. As shown, the platform 104 is a circular platform that is moveable (e.g., via a stepper motor). As also shown, the side view camera 126 is movable toward and away from the platform apparatus 102 (e.g., via a stepper motor).

Figure 2A:
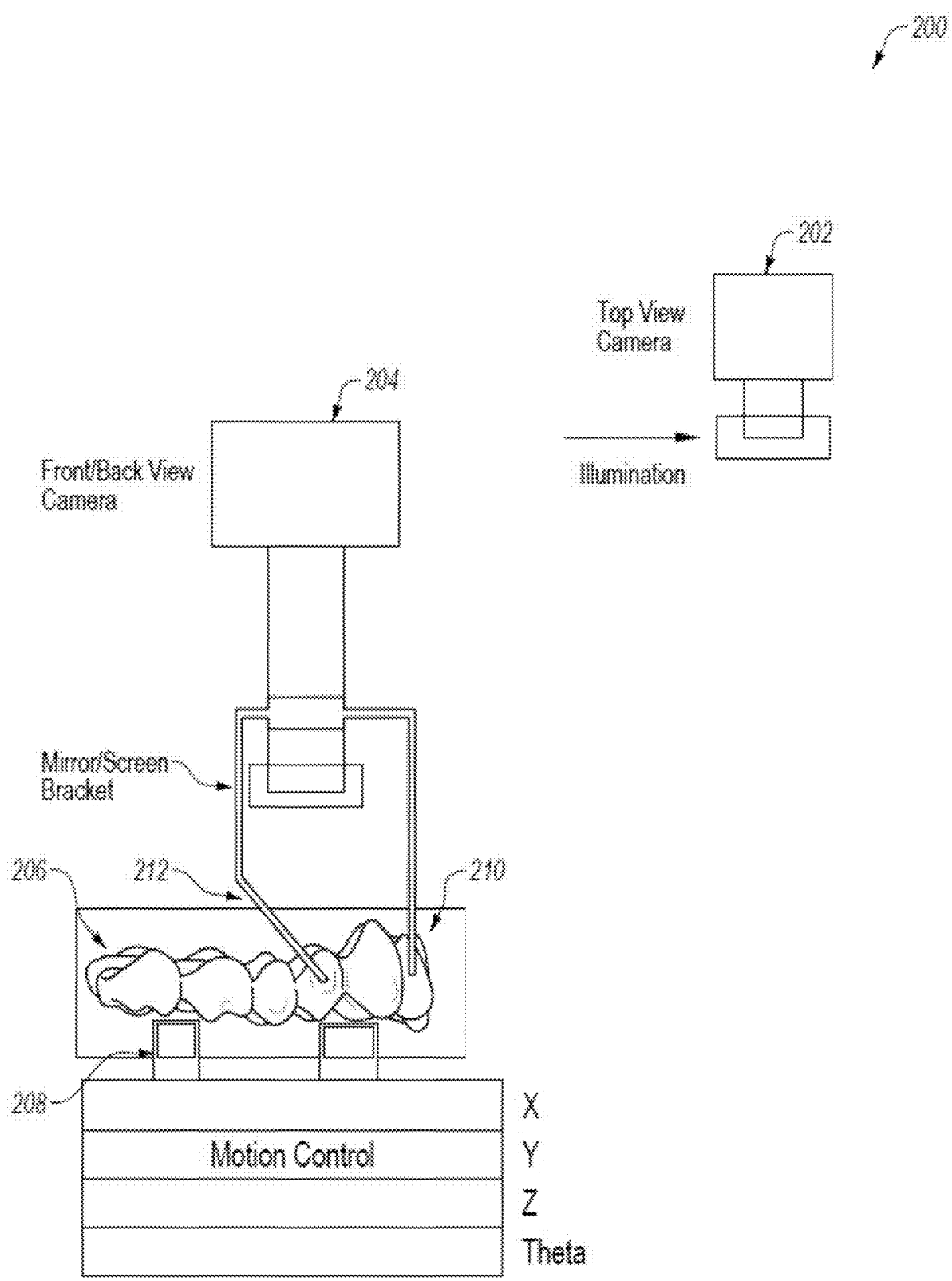
FIG. 2A illustrates one embodiment of an imaging defect detection system that performs automated defect detection of 3D printed objects and/or shells, in accordance with one embodiment.

FIG. 2A illustrates an example imaging system 200 including a top view camera 202 and a side view camera 204, in accordance with one embodiment. The imaging system 200 may be used to perform automated defect detection of a 3D object 206, in accordance with one embodiment. The 3D object 206 may be a 3D printed object or a shell that was formed using a 3D printed object. The 3D object 206 may be secured in a stationary position by a platform part holder 208. A top view camera 202 may be configured to acquire a top view image of the 3D object 206 using certain illumination settings to enable the 3D object 206 to be visible in the top view image. Processing logic may obtain an outline of a projection or silhouette of the 3D object 206, in accordance with an embodiment. The side view camera 204 may be used to acquire front and back side views of the 3D object by rotating around the 3D object 206 as it is held by the platform part holder 208 or by the 3D object 206 being rotated as the side view camera 204 remains stationary. In some embodiments, the 3D object 206 may not be secured by a platform part holder 208 and the 3D object 206 may be stationary on the platform while the side view camera 204 takes multiple images around the sides of the 3D object 206. The cameras 202 and 204 may be static and placed away from a conveyor path in some embodiments. The imaged 3D object 206 may be placed on an x-y-z-θ (4 axes of motion control) platform or stage in some embodiments.

The imaging system 200 may acquire separate front and back side view images without stray light interference from the side not currently under inspection by using a backing screen 210 in some embodiments. The backing screen 210 may be inserted into the gap between the front (buccal) and back (lingual) side of 3D object 206. In some embodiments, the backing screen is a dark screen. In some embodiments, the backing screen is a lit screen comprising one or more light emitting elements. A motion control and screen path may be determined for the 3D object 206 by identifying points between the front side and the back side of the 3D object that enable a screen path to be generated such that the backing screen 210 does not touch the 3D object throughout the screen path. Processing logic may detect a center of the 3D object and adjust the motion control and screen path parameters accordingly. Further, the motion control speed may be high enough to achieve an inspection cycle within a target time period (e.g., 10-20 seconds) for both the front side and the back side of the 3D object. A mirror 212 may be used as a deflector to capture the images from the back side or the front side of the plastic aligner as it is held in the platform part holder 208 in embodiments. The mirror 212 may be angled at a certain degree (e.g., 45°, 50°, 55°, etc.) and may be used in combination with a light source to enable images to be captured that profile particular regions of the 3D object 206 in some embodiments.

In some embodiments, the imaging system 200 may not use a backing plate. In some embodiments, the imaging system 200 can use a focused light to illuminate the 3D object 206. In an embodiment, the top view camera 202 may capture a top view image of the 3D object 206, and a top view contour may be extracted. In some embodiments, the 3D object 206 may be placed within the field of view of the top view camera 202 and the imaging system 200 may align the 3D object 206 to capture the top view image.

The top view image may be used to determine an inspection recipe including one or more side view images in some embodiments. Using the top view contour, contour x-y points may be transmitted to the side view camera 204. In some embodiments, properties of the camera, such as zoom and/or focus depth may be determined for the inspection recipe depending on which side of the 3D object 206 is being captured. For example, if the 3D object is an aligner configured to fit over a dental arch, or if the 3D object is a mold of a dental arch, the focus area of the side view camera 204 may be adjusted to focus on the 3D object depending on whether a lingual side or buccal side is being imaged. Further, the top view image may be used to rotate the 3D object 206 to proper orientation so the region under inspection is facing the side view camera 204. In some embodiments, the rotary motion required to rotate the 3D object 206 may occur simultaneously with the x-y motion of the side view camera 204 and may not affect inspection time.

An x-y-rotary stage motion control system or a multi-axis robot arm may be used to adjust the orientation and/or position of the camera and/or to adjust the orientation and/or position of the platform in order to acquire the appropriate images. In some embodiments, the 3D object 206 may rest on a glass platform and a cylinder of light may illuminate from below the glass platform.

The top view image and/or the side view images may be input into a trained machine learning model to determine whether any defects are included in the 3D object.

Figure 2B:
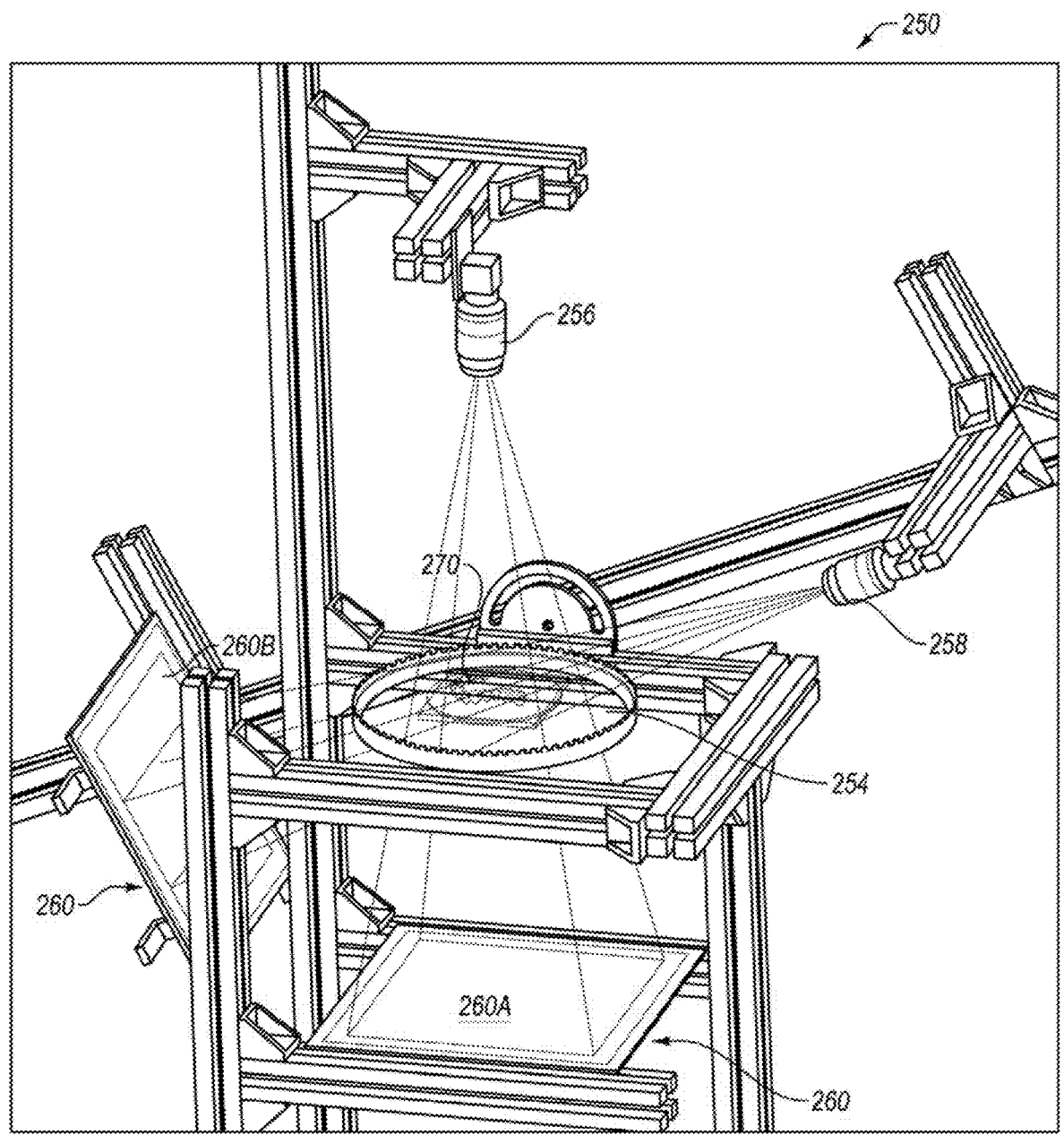
FIG. 2B illustrates one embodiment of imaging defect detection system that performs automated defect detection of 3D printed objects and/or shells, in accordance with one embodiment.

FIG. 2B illustrates an example imaging system 250 including a top view camera 256 and a side view camera 258, in accordance with one embodiment. The imaging system 250 may be used to perform automated defect detection of a 3D object 270, in accordance with one embodiment. The 3D object 270 may be a 3D printed object or a shell that was formed using a 3D printed object. The 3D object 270 may be disposed on a platform 254, which may be a rotatable platform. In one embodiment, the platform 254 is an x-y-z-θ (4 axes of motion control) platform. Top view camera 256 may be configured to acquire one or more top view image of the 3D object 270 using certain illumination settings of light source 260A and/or light source 260B.

Light source 260A and light source 260B may together form a variable aperture light source 260 with at least two aperture settings. In one embodiment, the variable aperture light source 260 has a first aperture setting of about 130 degrees (e.g., around 100-160 degrees) and a second aperture setting of about 40 degrees (e.g., about 20-60 degrees). The first aperture may be used to obtain images for reading a laser marking in the 3D object 270. The second aperture may be used for imaging used for defect detection.

Light source 260A may be a first part of the variable aperture light source 260, and light source 260B may be a second part of the variable aperture light source 260. The first and second light sources 260A, 260 Bmay be placed apart from one another with a particular angle of orientation between them. Each light source 260A, 260B may include one or more light emitting elements. In one embodiment, the light source 260A may be placed with an orientation such that an axis of the light source 260A is approximately parallel with an axis of the top view camera 256. The light source 260B may be offset from the light source 260A, and may be oriented such that an axis of the light source 260B is at about a 50-80 degree angle (e.g., a 65 degree angle) to the axis of the top view camera 256 and to the axis of the light source 260A. To generate an image that will enable the contours of the 3D object 270 to be determined, the light source 260A may be activated without activating the light source 260B (causing a low aperture illumination). To generate an image that will enable the laser marking to be read, the light source 260A and light source 260B may both be activated (causing a high aperture illumination). Processing logic may obtain an outline of a projection or silhouette of the 3D object 270, in accordance with an embodiment.

The side view camera 204 may be used to acquire front and back side views of the 3D object by rotating around the 3D object 270 as it is held by the platform 254 or by the 3D object 270 being rotated as the side view camera 258 remains stationary. In some embodiments, light source 260B is activated, but light source 260A is not activated, for generating side view images by side view camera 258. In some embodiments, an axis of light source 260B is approximately parallel to an imaging axis of side view camera 258.

The top view image and/or the side view images may be input into a trained machine learning model to determine whether any defects are included in the 3D object.

FIGS. 3A-6 are flow diagrams showing various methods for performing automated defect detection of a 3D printed part or a shell formed over a 3D printed mold (and optionally subsequently removed therefrom), in accordance with embodiments of the disclosure. Some operations of the methods may be performed by a processing logic that may comprise hardware (e.g., circuitry, dedicated logic, programmable logic, microcode, etc.), software (e.g., instructions run on a processing device to perform hardware simulation), or a combination thereof. The processing logic may execute on one or many processing devices (e.g., of computing device 135 of FIG. 1A). The processing logic may be processing logic of image inspection module 145 and/or of imager control module 140 in embodiments. Some operations of the methods may be performed by an imaging system, such as imaging system 101 of FIGS. 1A-B, or imaging system 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 3A:
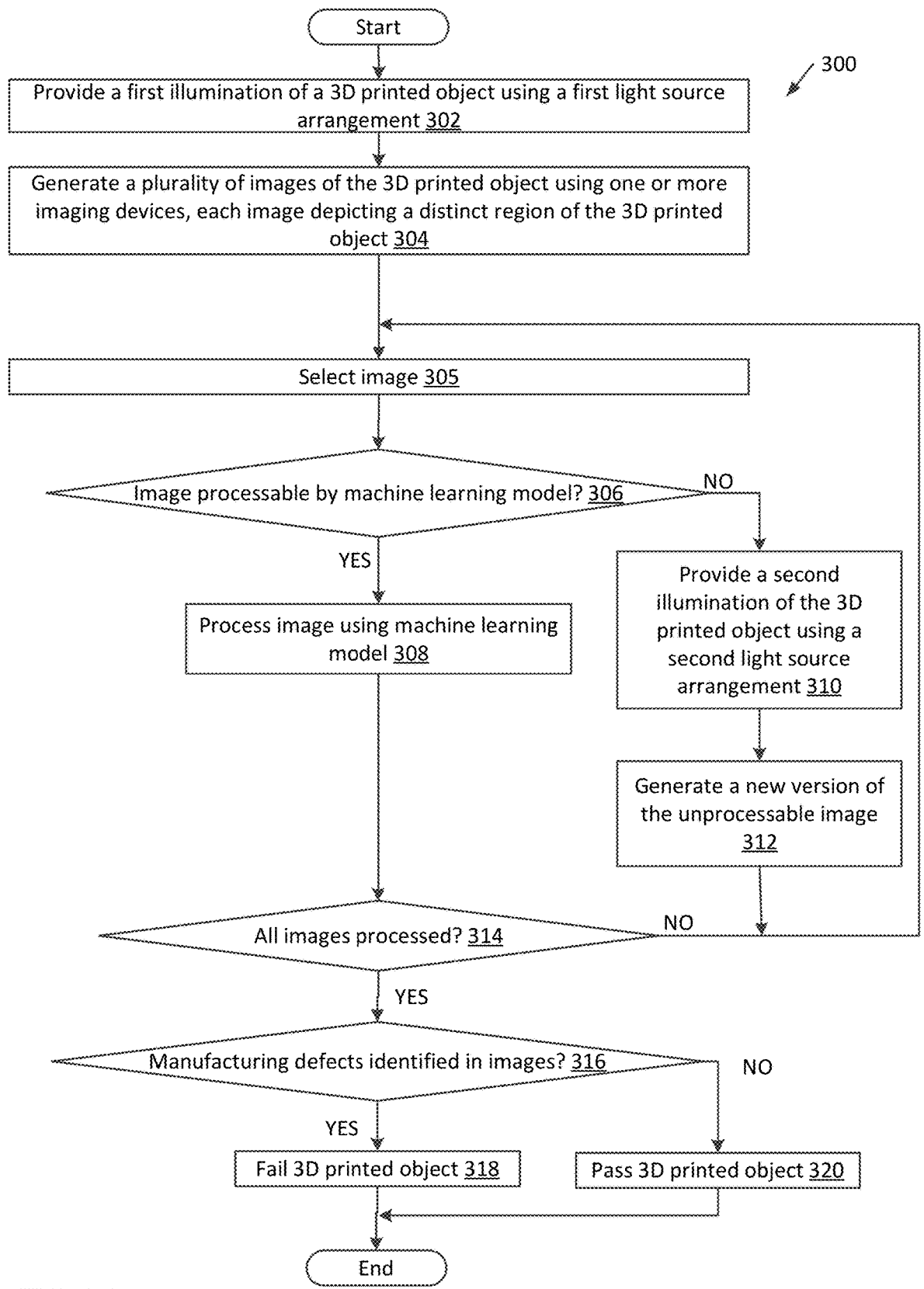
FIG. 3A illustrates a flow diagram for a method of detecting manufacturing defect in a 3D printed object, in accordance with one embodiment.

FIG. 3A illustrates a flow diagram for a method 300 of detecting a manufacturing defect in a 3D printed object or a 3D shell, in accordance with one embodiment. One or more operations of method 300 may be performed by a processing logic of a computing device. It should be noted that the method 300 may be performed for multiple unique 3D printed objects or unique 3D shells. In one embodiment, the method 300 may be performed for each unique mold for each stage of a patient's orthodontic treatment plan, where each unique mold is used to form a customized aligner for a particular stage of the orthodontic treatment plan. In a further embodiment, the method 300 may be performed for each unique aligner for each patient's treatment plan, where each unique aligner is customized for a stage of the treatment plan. The aligner may be a 3D printed aligner, or may have been formed by thermoforming a sheet of plastic over a 3D printed mold of a dental arch. Method 300 is described with reference to a 3D printed object. However, in embodiments method 300 may instead be performed for a shell that was formed using a 3D printed mold (e.g., of a dental arch).

At block 302, a first illumination of a 3D printed object may be provided using a first light source arrangement (e.g., a first set of light emitting elements from a first light source, second light source and/or third light source). The first illumination may be provided by an imaging system (e.g., by the imaging system depicted in FIGS. 1A and 1B, or by the imaging system depicted in FIG. 2A or FIG. 2B) based on instructions from processing logic. In one embodiment, the first illumination may be provided by light emitting elements from at least one of a first light source or a second light source included on a platform apparatus, and/or light emitting elements from a third light source that may be included on a top view camera apparatus. A processing logic may determine which light emitting elements from the one or more light sources to activate and which light emitting elements not to activate, in accordance with first illumination settings, and may send instructions to the light sources to cause the determined light emitting elements to activate.

At block 304, a plurality of images of the 3D printed object may be generated using one or more imaging devices (e.g., side view camera and/or top view camera) based on instructions from processing logic.

In one embodiment, at least one image is generated by a top view camera provided by the imaging system depicted in FIG. 1A or FIG. 2A or FIG. 2B. The first image may then be received and processed by the processing logic.

Figure 3B:
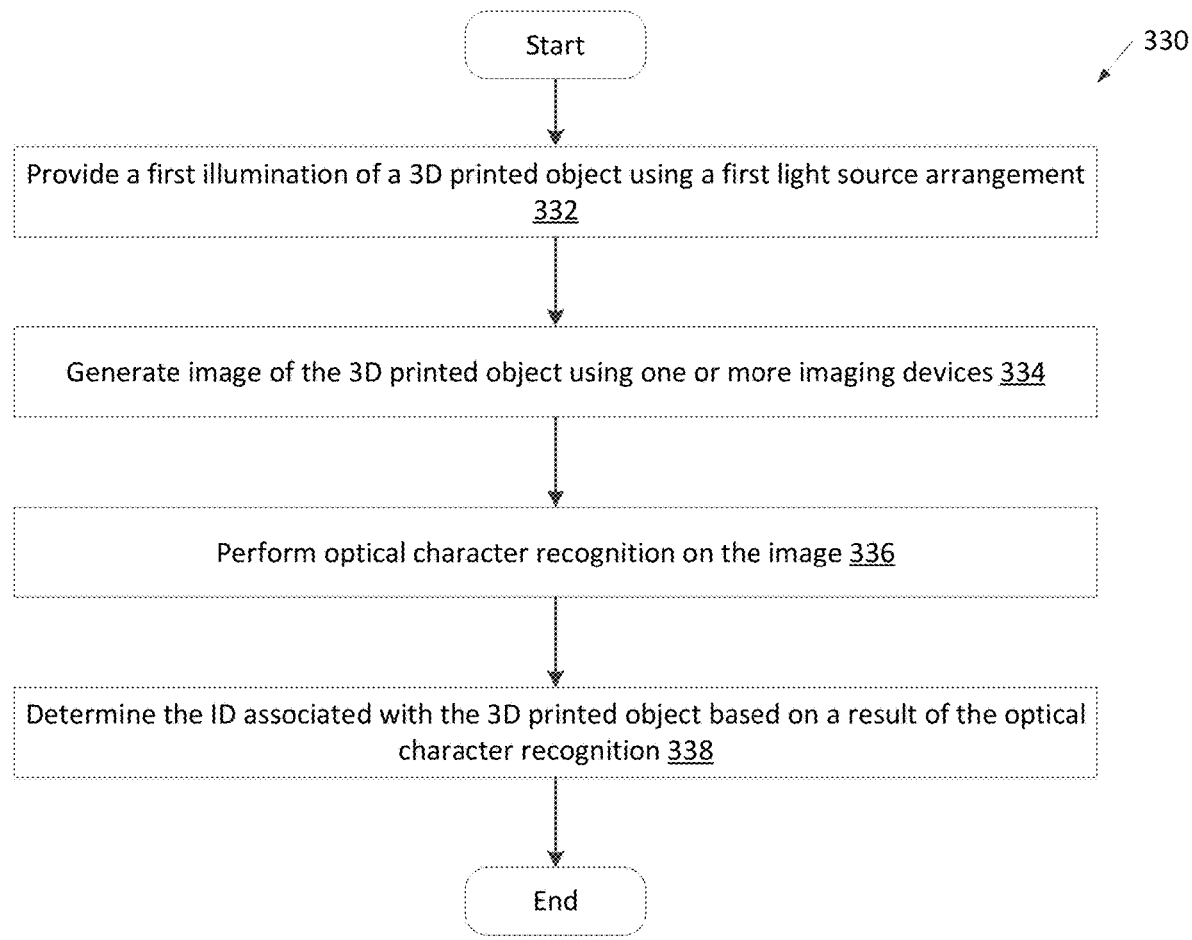
FIG. 3B illustrates a flow diagram for a method of determining an identifier (ID) associated with a 3D printed object, in accordance with one embodiment.
Figure 4:
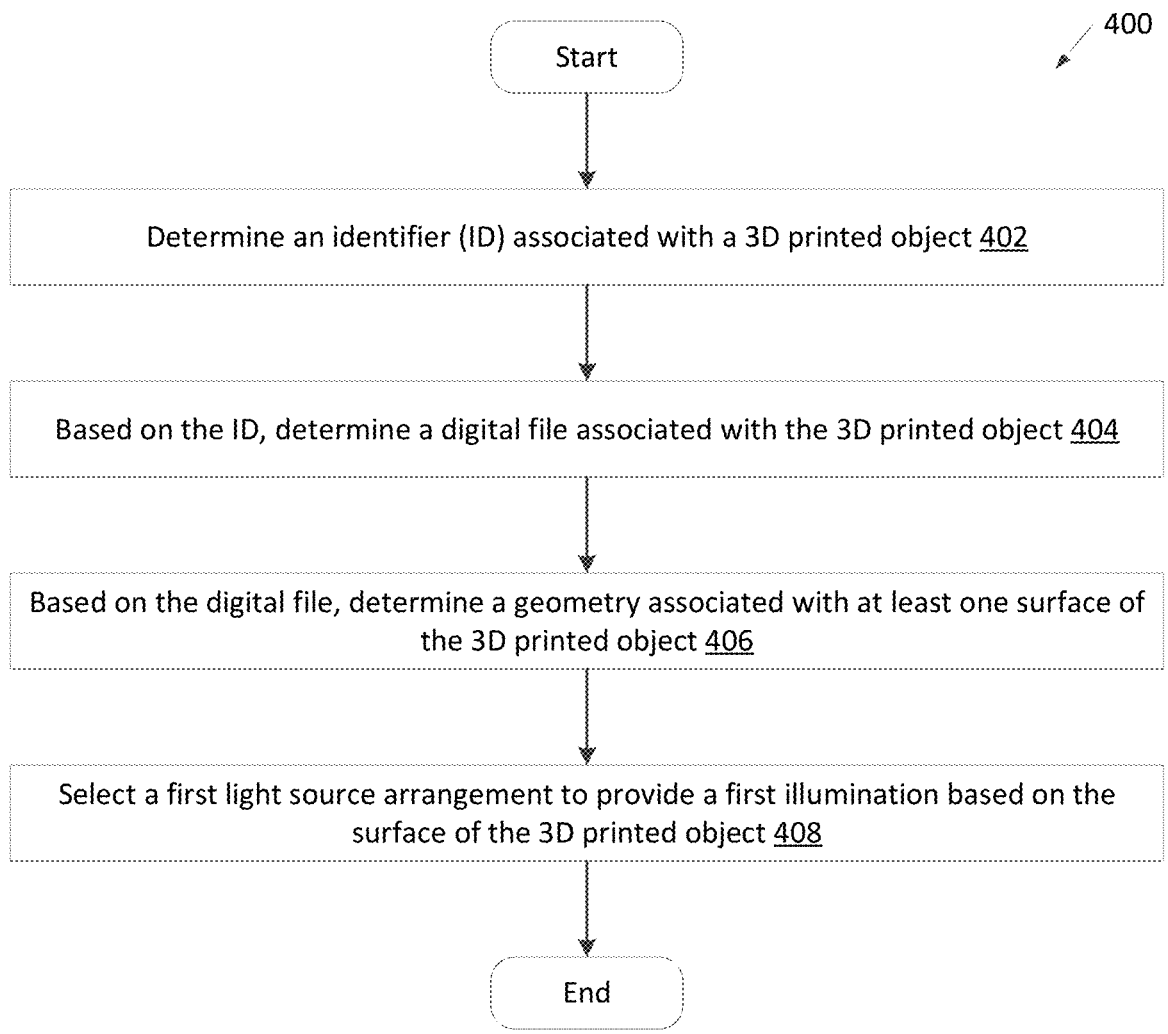
FIG. 4 illustrates a flow diagram for a method of determining a first illumination for capturing an image of a 3D printed object, in accordance with one embodiment.

In one embodiment, the first image is used to select an illumination setting for the generation of additional images, as set forth in FIG. 4. The first image may include a representation of an ID (e.g., symbol sequence) on a distinct region of the 3D printed object. In one embodiment, the first image was generated under particular lighting conditions that increase a clarity and/or contrast of laser markings (e.g., where the representation of the ID is a laser marking), as descried above. In some embodiments, the processing logic may perform optical content recognition (OCR) on the first image to identify the symbol sequence to determine the ID, in accordance with the method depicted in FIG. 3. The ID may be associated with the 3D printed object depicted in the first image. The processing logic may determine a digital file associated with the ID. The digital file may include one or more properties associated with at least one surface of the 3D printed object. The digital file may further include a light source arrangement (illumination setting) associated with the first property and/or the second property. The processing logic may cause illuminated particular illumination based on the light source arrangement associated with the digital file. In another embodiment, the processing logic may cause one or more light emitting elements to emit a specified wavelength of light.

Figure 5:
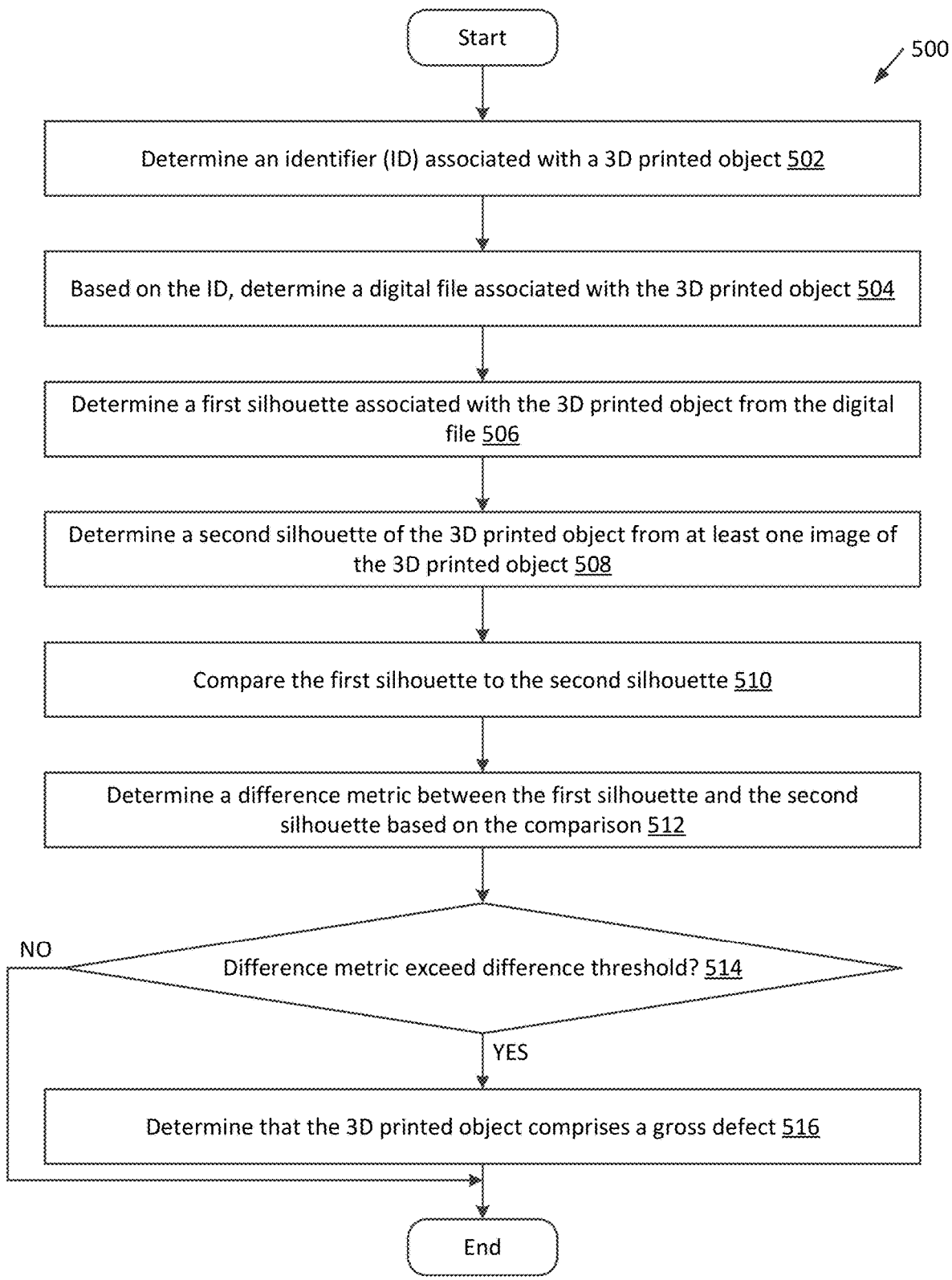
FIG. 5 illustrates a flow diagram for a method of detecting a gross defect of a 3D printed object, in accordance with one embodiment.

The first image may be used to determine gross defects in the 3D printed object, as set forth in method 500 of FIG. 5 in some embodiments.

At least one image of the plurality of images of the 3D printed object may be generated by a side view camera provided in the imaging system depicted in FIGS. 1A and 1B, or by the imaging system depicted in FIG. 2A or FIG. 2B. The side view camera may be configured to capture side views of the 3D printed object. Each image of the plurality of images may depict a distinct region of the 3D printed object (e.g., a tooth of a mold for an orthodontic or polymeric aligner), and may be generated using a combination of one or more of a particular zoom setting, a particular angle setting of the side view camera, a particular position (e.g., x-coordinate) setting of the side view camera, a particular rotation and/or translational motion setting of a platform supporting the 3D printed object, particular x,y,z,θ settings of the platform, and so on.

In some embodiments, the platform 104 may be in motion while images are generated of the 3D printed object. For example, the platform 104 may move on at least one axis of motion and/or rotate while images or a video are generated. The processing logic may determine a degree, velocity, or acceleration of the rotation and/or translational motion of the platform while images are captured. In another embodiment, the side view camera may be attached to a moveable base. The processing logic may determine the location, velocity, or acceleration of the moveable base while images are being captured. In one embodiment, the side view camera is a high speed vision camera that is capable of generating an image every millisecond. In one embodiment, all images of the 2D printed object may be generated within a matter of seconds (e.g., in about 2 seconds). At block 305, an image is selected from the plurality of images.

At block 306, the processing logic may determine whether the image is processable by a machine learning model. In one embodiment, the processing logic may determine whether the image is processable based on a contrast of the image. Processing logic may generate a contrast metric for the image. The processing logic may then compare the contrast metric with a contrast threshold. If the contrast metric falls below the contrast threshold, the processing logic may determine the first image is not processable by the machine learning model, and the method may continue to block 310. If the contrast metric does not fall below the contrast threshold, the processing logic may determine that the image is processable by the machine learning model and the processing logic may continue to block 308. In some operations, the operations of block 306 are omitted.

At block 310, the processing logic may provide a second illumination to the 3D printed object using a second light source arrangement. To provide the second illumination, processing logic may determine a new set of light emitting elements from a first light source, second light source and/or third light source that provides a different illumination than the first illumination. In one embodiment, the processing logic may input data into a machine learning model to determine an illumination setting for the second illumination, as set forth above. Processing logic may then instruct the one or more light sources as to which light emitting elements to activate. The second illumination may be selected so as to provide a different light pattern, shadow pattern, contrast, etc. on the 3D printed object than provided by the first illumination.

At block 312, a new version of the unprocessable image may be generated. The new version of the unprocessable image may include a new image depicting the same distinct region of the 3D printed object depicted in the unprocessable image. In one embodiment, processing logic determines one or more settings of the multi-axis platform and/or the side view camera that were used to generate the selected image, and causes the multi-axis platform and the side view camera to have the same or similar settings for the generation of the new version of the unprocessable image. In one embodiment, the new image may depict a different distinct region of the 3D printed object that was depicted in the unprocessable image. For example, the new image may depict a zoomed in view of the distinct region that was depicted in the unprocessable image. The new image may be generated by at least one imaging device (e.g., the top view camera or the side view camera). After the new image is generated, the processing logic may replace the unprocessable image in the plurality of images with the new version of the unprocessable image.

After the new version of the unprocessable image is generated and has replaced the unprocessable image of the plurality of images, the method will return to block 305, where the new image will eventually be selected at block 305 to determine whether the image is processable by the machine learning model.

Figure 6:
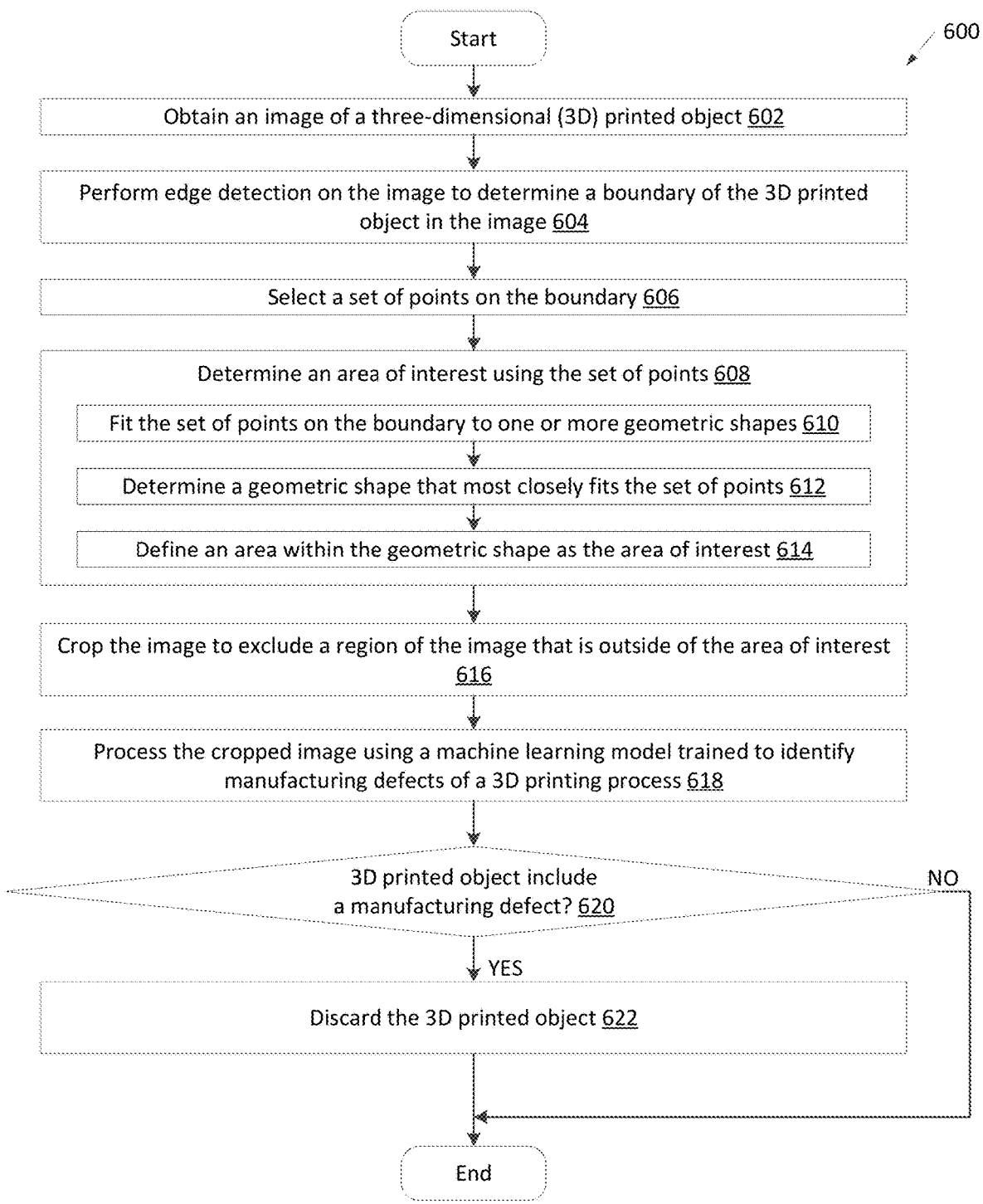
FIG. 6 illustrates a flow diagram for a method of processing an image captured by an imaging system to detect a layering defect in a 3D printed object, in accordance with one embodiment.

If the processing logic determines that an image selected at block 305 is processable by the machine learning model, the method will continue to block 308, where the image is processed by the machine learning model in accordance with the method of FIG. 6. The machine learning model may be trained to receive an image of a 3D printed object or a shell originally formed over a 3D printed object as an input, and to provide as an output an indication of one or more types of defects. In one embodiment, the machine learning model outputs a classification that indicates whether or not a defect has been detected. In one embodiment, the machine learning model may identify multiple different types of defects, and indicate for each type of defect whether that type of defect has been identified in the image. For example, the output may include a vector having multiple elements, where each element may include a value representing a probability that the image contains a defect of a particular defect type. In a further example, an output may indicate a 90% probability of an internal volume defect, a 15% probability of a surface defect, a 2% probability of an interface defect, a 5% probability of a line thickness defect, and an 8% chance of a delamination defect. Defect probabilities that are above a threshold (e.g., 80% probability, 90% probability, etc.) may be classified as defects. Defect probabilities that are below the threshold may be classified as defect-free.

In one embodiment, in addition to identifying the presence of defects, the machine learning model also outputs coordinates associated with the identified defect. The coordinates may be x, y pixel locations in the input image. Processing logic may then mark the image with the coordinates of the defect in some embodiments. Additionally, processing logic may indicate a type of defect identified at the identified coordinates in embodiments. This may enable a user to quickly review and double check results of positive defect classifications.

In one embodiment, the machine learning model may output a confidence metric for each defect probability that it outputs. The confidence metric may indicate a confidence level associated with the output defect probability. If a confidence metric is low, this may indicate that there was insufficient detail and/or contrast in the image to accurately determine whether a defect exists. In some embodiments, the confidence metric output by the machine learning model is compared to a confidence threshold. If the confidence metric is below the confidence threshold, then the method may proceed to block 310 (not shown in figure). This may be performed instead of or in addition to the operations of block 306.

In one embodiment, the machine learning model may output a defect rating for each defect or group of defects identified in an input image. The defect rating may rate a manufacturing defect in accordance with the severity of the defect and/or the likelihood that the defect will later cause a deformation or a malfunction. The defect rating may be based on a density or quantity of defects identified in the image as well as sizes of the defects and/or the types of defects. At block 314, the processing logic may determine whether all of the images generated have been processed. If any of the images from the plurality of images have not yet been processed, the method returns to block 305, and a new image is selected. Note that the operations of block 305-314 may begin before all images of a 3D printed object have been generated. For example, imaging system 101 may begin taking images of a 3D printed object, and processing logic may start processing a first one or more images while the imaging system 101 continues to generate additional images. In some embodiments, multiple threads may be instantiated, and each thread may process one or more images in parallel to speed up the defect detection process. Once all images have been processed, the method continues to block 316.

At block 316, the processing logic may determine whether any manufacturing defects are identified in any of the images. The processing logic may evaluate each output generated by the machine learning model for each image of the plurality of images. In one embodiment, the processing logic may determine a manufacturing defect is identified in the images if at least one defect is identified in at least one image of the plurality of images by the machine learning model. In one embodiment, the processing logic determines a combined defect rating for images of the 3D printed object. The combined defect rating may be based on the defect ratings associated with each of the images. Processing logic may then determine whether the combined defect rating exceeds a defect threshold.

In one embodiment, the machine learning model may modify the defect rating for a defect based on the location or severity of other defects identified in another image of the plurality of images. For example, the machine learning model may have generated a low defect rating for a defect identified in a first image of a 3D printed object and a high defect rating for a defect identified in a second image of the 3D printed object. The processing logic may determine that the defect identified in the first image could contribute to a deformation or malfunction caused by the defect identified in the second image, and may adjust a rating of the defect identified in the first image to a high defect rating.

If the combined defect rating falls below the defect threshold, the processing logic may determine that a manufacturing defect is not identified in the plurality of images associated with the 3D printed object, and the method 300 may continue to block 320. If the combined defect rating exceeds the defect threshold, the processing logic may determine that a manufacturing defect is identified in the plurality of images associated with the 3D printed object, and the method 300 may continue to block 318.

At block 318, the processing logic may fail the 3D printed object based on the output provided by the machine learning model (the 3D printed object may fail quality control and be identified as defective). In one embodiment, the failed 3D printed object may be fixed to remove the manufacturing defect. In a further embodiment, the 3D printed object may be prevented from being used further in a manufacturing process or shipped to a user. In another embodiment, the 3D printed object may be scrapped and a replacement may be manufactured.

A record may be kept of which 3D printers manufacture each 3D printed object output by a manufacturer or location. For example, a database may be maintained that includes a separate entry for each 3D printed object. One field of an entry may be an ID of the 3D printed object. Another field may be a patient ID. Another field may be a treatment plan ID. Another field may be a 3D printer ID identifying the 3D printer of that 3D printed object. In a further embodiment, the processing logic may identify a 3D printer that manufactured the failed 3D printed object (e.g., based on the 3D printer ID associated with the 3D printed object). The processing logic may determine other 3D printed objects that were printed by that 3D printer, and may determine whether the 3D printer that manufactured the failed 3D printed object manufactured one or more additional 3D printed objects that also included manufacturing defects (and may have failed quality inspection as well). The combined information of the 3D printed objects that have failed quality control and/or their defects may be used to determine whether to schedule maintenance on the 3D printer. For example, a trend of increasing amounts of defects in 3D printed objects manufactured by a particular 3D printer may be identified, and maintenance may be scheduled for the 3D printer based on the trend. In one embodiment, a defect score is computed for the 3D printer based on the defects in 3D printed objects manufactured by the 3D printer. If the defect score exceeds a threshold, then maintenance may be scheduled for the 3D printer. In one embodiment, a trained machine learning model (e.g., a recurrent neural network (RNN)) is trained to determine when to schedule maintenance for a 3D printer based on defects of 3D objects manufactured by that 3D printer. For example, combined defect results for each 3D printed object manufactured by the 3D printer may be input into the RNN over time. The RNN may determine when a pattern in increasing amounts of defects indicates that maintenance should be scheduled, and may output a recommendation of scheduling maintenance. Processing logic may then schedule maintenance on the 3D printer so to prevent manufacturing defects from forming on additional 3D printed objects based on the output of the RNN.

At block 320, the processing logic passes the 3D printed object based on the outputs provided by the machine learning model at block 308. If few or no manufacturing defects are identified in one or more of the images, for example, the 3D printed object may pass quality control and be identified as acceptable.

FIG. 3B illustrates a flow diagram for a method 330 of determining an ID associated with a 3D printed object or a shell, in accordance with one embodiment. At block 332, a first illumination of a 3D printed object or a shell may be provided using a first light source arrangement. The first light source arrangement may be provided by the imaging system depicted in FIGS. 1A and 1B, or by the imaging system depicted in FIG. 2A or FIG. 2B. At block 334, an image of the 3D printed object may be generated using one or more imaging devices (e.g., top view camera and/or side view camera). In one embodiment, the image is generated by a top view camera provided by the imaging system depicted in FIG. 1A. In one embodiment, the image is generated by a camera of the imaging system depicted in FIG. 2. At block 336, OCR is performed on the image. The processing logic may process the image to identify a location of a symbol sequence in the image. The symbol sequence may contain letters, numbers, special symbols, punctuation symbols, etc. The processing logic may then perform OCR on the symbol sequence. The OCR may be performed using any known method, such as matrix matching, feature extraction, or a combination thereof. In one embodiment, the processing logic may apply one or more conversion operations to the image to more clearly process the symbol sequence. Conversion operations may include changing the resolution of the image, performing binarization of the image using certain parameters, correction of distortions, glare, or fuzziness, performing noise reduction operations, etc. These operations may be applied to the entire image or the portion of the image containing the identified symbol sequence.

In one embodiment, the symbol sequence may not be displayed entirely by the image generated by the imaging system. For example, the image may depict a distinct region of the 3D printed object or the shell containing one half of the symbol sequence. In one embodiment, the processing logic may generate at least one additional image of the location of the symbol sequence. If the newly generated image includes the entire symbol sequence, the processing logic may process the image in accordance with the procedure described above. If the newly generated image depicts another half of the symbol sequence, processing logic may perform a stitching operation to generate a single image containing the symbol sequence. The processing logic then may perform the OCR according to the procedure described above.

At block 338, the ID associated with the 3D printed object or the shell may be determined based on a result of the OCR. After the OCR is performed according to block 336, the processing logic may produce a first result containing a computer-readable version of the symbol sequence identified in the image. The processing logic may compare the first result to one or more 3D printed object IDs (or shell IDs) to determine whether the first result corresponds to a known 3D printed object ID or a known shell ID. If the first result is not determined to correspond to a known 3D printed object ID or a known shell ID, the first result is rejected. In one embodiment, a second OCR operation may be performed on the image to generate a second result. In another embodiment, an OCR operation may be performed on a different image than the image that generated the first result in order to generate a second result. If the first or second result is determined to correspond to a known 3D printed object identifier or a known shell identifier, the processing logic determines the first or second result is the ID associated with the 3D printed object or the shell.

Figure 9:
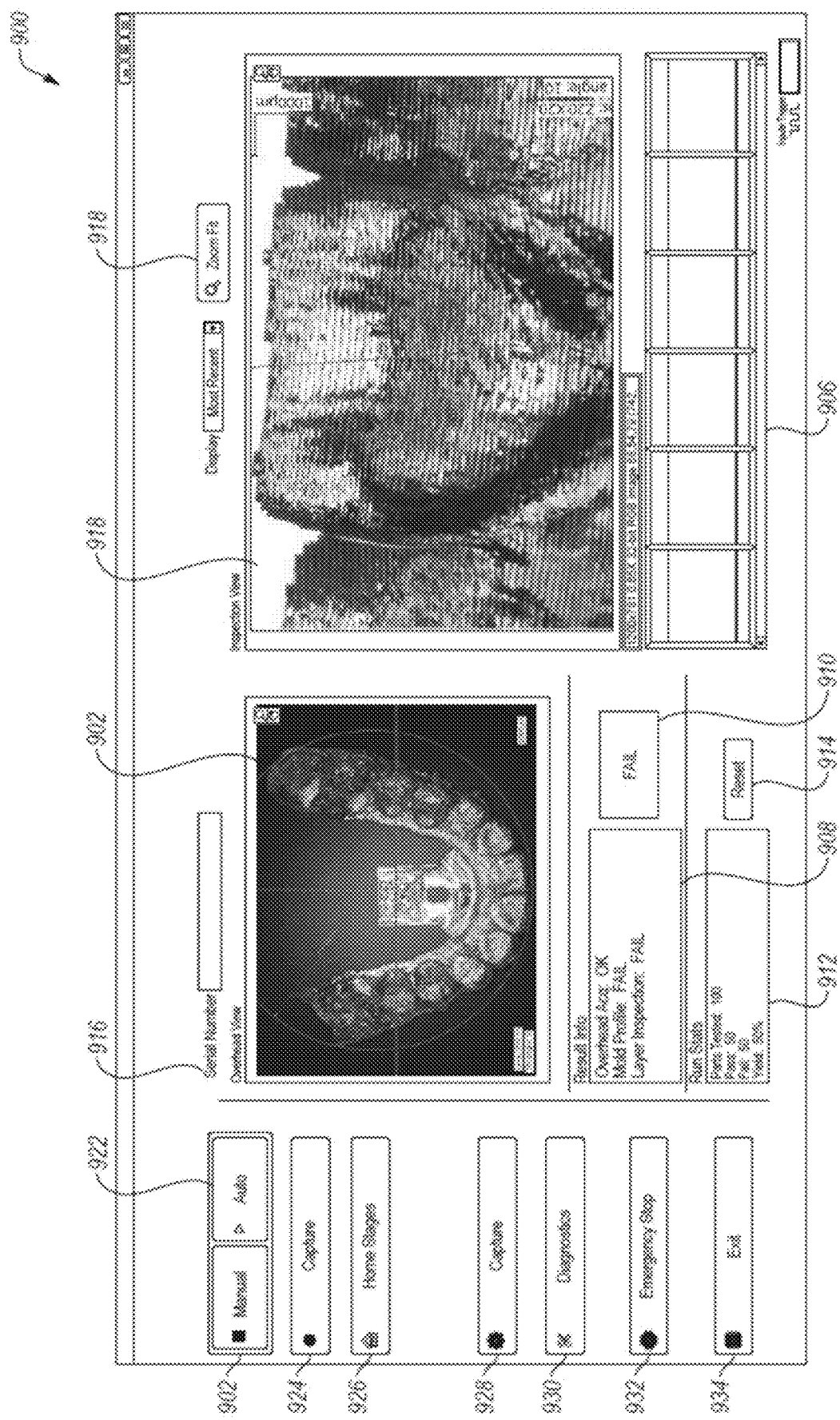
FIG. 9 illustrates an example user interface (UI) for system control and image acquisition functions of an imager control module, in accordance with one embodiment.

In another embodiment, a technician may manually input the ID associated with the 3D printed object or the shell at an inspection station using an interface, such as the UI illustrated in FIG. 9. In another embodiment, a 3D printed object and/or shell sorting system may sort a series of 3D printed objects and/or shells in a known order. The processing logic may retrieve the 3D printed object order (or the shell order) from the 3D printed object and/or shell sorting system in order to know which of the 3D printed objects or shells are currently being processed and the order in which they arrived at the imaging system. Optionally, the 3D printed object or the shell may arrive at the imaging system in a tray carrying the 3D printed object identifying information or shell identifying information (e.g., RFID tag, barcode, serial numbers, etc.), which is read by the imaging system depicted in FIGS. 1A and 1B, or by the imaging system depicted in FIG. 2A or FIG. 2B. Thereafter, the processing logic may retrieve a digital file associated with the 3D printed object or the shell based on the 3D printed object identification information or the shell identification information, in accordance with the method described for FIG. 4.

FIG. 4 illustrates a flow diagram for a method 400 of determining a first illumination for capturing an image of a 3D printed object, in accordance with one embodiment. At block 402, processing logic may determine an ID associated with a 3D printed object. The ID may be determined by any of the ID determination methods described for the method depicted in FIG. 3.

At block 404, a digital file associated with the 3D printed object may be determined, based on the ID associated with the 3D printed object. In some embodiments, the digital file may be associated with a mold that is customized for a dental arch of a patient and undergoing inspection. In some embodiments, the digital file may be associated with an aligner that is customized for a dental arch of a patient and undergoing inspection. The digital file may include a digital model of a mold that is customized for a dental arch of a patient. The digital file may also include a digital model of an aligner that is customized for a dental arch of a patient. In one embodiment, the digital model of the aligner may be generated based on the manipulation of a digital model of a mold of a patient's dental arch at a stage of orthodontic treatment.

At block 406, a geometry associated with at least one surface of the 3D printed object may be determined, based on the digital file. In one embodiment, the geometry may be determined based on the digital model of a mold that is associated with the digital file. In another embodiment, the geometry may be determined based on the digital model of a shell that is associated with the digital file.

At block 408, a first light source arrangement to provide a first illumination is selected based on the geometry associated with at least one surface of the 3D printed object. In one embodiment, the first light source arrangement based on the geometry may be included in the digital file. In one embodiment, the first light source is determined by inputting the digital model of the 3D printed object into a machine learning model trained to optimal determine illumination for 3D printed objects. In one embodiment, the machine learning model determines different optimal illumination (e.g., sets of light emitting elements to activate) for different camera angles relative to the 3D printed object. Accordingly, the output may include multiple different illumination settings, where each illumination setting may correspond to a particular camera angle relative to the 3D printed object (e.g., a particular rotation and/or translational motion setting of the multi-axis platform). The processing logic may cause one or more light emitting elements of a first, second, and/or third light source of an imaging system to be activated based on the first light source arrangement (illumination setting).

In a further embodiment, a composition or material associated with the 3D printed object may be determined based on the digital file. In another embodiment, the first light source arrangement may be modified based on the composition or material associated with the 3D printed object. For example, the processing logic may cause one or more light emitting elements that emit a particular wavelength of light to be activated, where the composition or material may be transparent or translucent to the particular wavelength of light.

FIG. 5 illustrates a flow diagram for a method 500 of detecting a gross defect of a 3D printed object, in accordance with one embodiment. Method 500 may also be performed to determine a gross defect of a shell that was thermoformed over a 3D printed mold. In one embodiment, a gross defect on a mold of a dental arch used to form an orthodontic and/or polymeric aligner, or on a directly printed orthodontic and/or polymeric aligner, may include arch variation, deformation, bend (compressed or expanded), cutline variations, webbing, trimmed attachments, missing attachments, burrs, flaring, power ridge issues, material breakage, short hooks, and so forth. At block 502, an ID associated with the 3D printed object is determined. The ID may be determined using any of the ID determination methods described for the method depicted in FIG. 3.

At block 504, a digital file associated with the 3D printed object may be determined. The digital file may be determined from a set of digital files. The digital file may be associated with the 3D printed object based on the ID. Each digital file of the set of digital files may include a digital model (e.g., a virtual 3D model) of the 3D printed object. In one embodiment, each digital file may include a digital model of a mold used to manufacture an aligner. Each digital file may be for a unique, customized 3D printed object. In one embodiment, each digital file may be for a specific mold customized for a specific patient at a particular stage in the patient's treatment plan.

In one embodiment, the 3D printed object may be a directly fabricated aligner. In a further embodiment, the digital file associated with the ID may include a digital model of a first aligner that is dynamically generated by the processing logic or that is received from another source. The digital model of the first aligner may be dynamically generated by manipulating a digital model of a mold used to manufacture the first aligner. The digital model of the first aligner may be generated by simulating a process of thermoforming a film over a digital model of the mold by enlarging the digital model of the mold into an enlarged digital model (e.g., by scaling or inflating a surface of the digital model). Further, generation of the digital model of the first aligner may include a projection of a cutline onto the enlarged digital model, virtually cutting the enlarged digital model along the cutline to create a cut enlarged digital model, and selecting the outer surface of the cut enlarged digital model. In one embodiment, the digital model of the first aligner comprises an outer surface of the first aligner, but does not necessarily have a thickness and/or does not comprise an inner surface of the first aligner, though it may include a thickness or inner surface in other embodiments.

In one embodiment, the digital file may include a virtual 3D model of a mold that is used to manufacture the first aligner. In one embodiment, the digital file may include multiple files associated with the first aligner, where the multiple files include a first digital file that comprises a digital model of the mold and a second digital file comprises a digital model of the first aligner. Alternatively, a single digital file may include both a digital model of the mold and a digital model of the first aligner.

At block 506, the processing logic may determine a first silhouette for the first 3D printed object from the first digital file. In one embodiment, the first silhouette is included in the first 3D printed object. In one embodiment, the first silhouette is based on a projection of the digital model of the first 3D printed object onto a plane defined by an image of the first 3D printed object (e.g., an image generated by the top view camera). In one embodiment, the first silhouette is based on a manipulation of a digital model the first 3D printed object. For example, in some embodiments, the first silhouette may be based on a projection of the digital model of the 3D printed object onto the plane defined by the image of the 3D printed object. In such instances, the projection of the 3D printed object may be scaled or otherwise adjusted to approximate a projection of a 3D printed object from a particular point of view (e.g., the point of view of the top view camera). In a further embodiment, the first silhouette may be based on a manipulation of the digital model, wherein the manipulation causes an outer surface of the digital model to have an approximate shape of the 3D printed object, and is further based on a projection of the outer surface of the digital model onto the surface defined by the image of the 3D printed object. In some embodiments, the first silhouette may be determined from an approximated outer surface of the 3D printed object. In some embodiments, the first silhouette may include a first shape of a projection of the outer surface of the first 3D printed object onto a plane defined by an image of the 3D printed object.

At block 508, a second silhouette of the 3D printed object may be determined from at least one image of the 3D printed object. An image of the 3D printed object may define a plane. The second silhouette may include an outline of a second shape of the 3D printed object as projected onto the plane defined by the 3D printed object. The second silhouette may be determined directly from one or more images (e.g., top view, side view, etc.). In one embodiment, a contour of the second shape is drawn from the image to form the second silhouette (e.g., based on performing edge detection on the image to identify the contour).

At block 510, the processing logic may compare the first silhouette to the second silhouette. The processing logic may identify, based on comparing the first silhouette to the second silhouette, one or more differences between the first silhouette and the second silhouette. In some embodiments, the processing logic may identify the one or more differences by determining one or more regions where the first shape of the first silhouette and a second shape of the second silhouette do not match. The processing logic may further determine the differences of the regions (e.g., at least one of a thickness of the one or more regions or an area of the one or more regions).

At block 512, the processing logic may generate a difference metric between the first silhouette and the second silhouette based on the comparison done at block 510. The difference metric may include a numerical representation of the differences between the first silhouette and the second silhouette.

At block 514, the processing logic may determine whether the difference metric determined at block 512 exceeds a difference threshold. The difference threshold may be any suitable configurable amount (e.g., difference greater than three millimeters (mm), 5 mm, 10 mm, a region having an area greater than one hundred mm squared, etc.). If the difference metric exceeds the difference threshold, at block 516, the processing logic may classify the 3D printed object as having a gross defect. In one embodiment, the 3D printed object classified as having a gross defect may be further classified as deformed. If it is determined that the difference metric does not exceed the difference threshold, the processing logic may determine that the shape of the 3D printed object does not have a gross defect and may proceed to perform other methods in accordance with this disclosure, such as the method disclosed in FIG. 6 (e.g., layering defect detection).

If it is determined that the difference metric exceeds the difference threshold, at block 516, it is determined that the 3D printed object includes a gross defect. In one embodiment, a 3D printed object with a gross defect may be fixed so as to remove the gross defect. In another embodiment, a 3D printed object with a gross defect may be scrapped and a replacement 3D printed object may be manufactured prior to use or shipment of the 3D printed object.

If it is determined that the different metric does not exceed the difference threshold, the method terminates. In one embodiment, if the one or more differences do not exceed the difference threshold, then the processing logic may perform additional comparisons. In one embodiment, the processing logic may perform additional comparisons for molds or for aligners. FIG. 6 illustrates a flow diagram for a method 600 of processing an image captured by an imaging system to detect a defect (e.g., a fine defect such as a layering defect) on or in a 3D printed object, in accordance with one embodiment. In one embodiment, the method 600 may be performed for each unique mold for each patient's treatment plan, where each unique mold is customized for one or more stages (e.g., key stages) of the treatment plan. In a further embodiment, the method 600 may be performed for each unique aligner for each patient's treatment plan, where each unique aligner is customized for one or more stages (e.g., key stages) of the treatment plan.

At block 602, an image of a 3D printed object is obtained by the processing logic. The image may have been generated as one of a plurality of images by imaging system 101 depicted in FIGS. 1A, 1B, 2A and/or 2B. In one embodiment, the image may be generated by a top view camera provided by the imaging system 101. The top view camera may be configured to acquire top view images of the 3D printed object. In another embodiment, at least one image may be generated by a side view camera provided in the imaging system 101 depicted. The side view camera may be configured to capture side views of the 3D printed object. Each image of the plurality of images may depict a distinct region of the 3D printed object (e.g., a tooth of a mold for an orthodontic or polymeric aligner).

At block 604, edge detection (or other differencing process) is performed on the image to determine a boundary of the 3D printed object in the image. The edge detection may include application of an automated image processing function, such as an edge detection algorithm. One example edge detection operation or algorithm that may be used is multi-scale combinatorial grouping. Other examples of edge detection algorithms that may be used are the Canny edge detector, the Deriche edge detector, first order and second order differential edge detectors (e.g., a second order Gaussian derivative kernel), a Sobel operator, a Prewitt operator, a Roberts cross operator, and so on. A segmentation operation (e.g., a tooth segmentation operation) may also be performed on the image instead of, or in addition to, the edge detection. In one embodiment, a segmentation operation may be applied to segment the 3D printed object into separate objects, so as to highlight distinct regions of the 3D printed object depicted in the image. In one embodiment, a combination of multiple edge detection algorithms and/or segmentation algorithms is used for edge detection.

At block 606, a set of points may be selected on the boundary. In one embodiment, one portion of the image within the boundary may include more contrast than another portion of the image within the boundary. In such embodiment, the set of points may be selected on the boundary towards the portion of the image with more contrast. For example, if the image depicts a mold of an orthodontic or polymeric aligner, the boundary may indicate a tooth of the mold within the area of the boundary. The portion of the tooth towards the top or crown of the tooth may include more contrast than the portion of the tooth towards the bottom of the crown. Therefore, the set of points may be selected towards the top or crown of 3D printed object depicted in the image.

At block 608, an area of interest is determined using the set of points. In one embodiment, the processing logic may generate a plurality of shapes that correspond to the set of points. The processing logic may apply each shape of the plurality of shapes to the set of points. For each shape applied to the set of points, the processing logic may generate a rating, wherein the rating is based on the number of points the shape is able to connect to with. The processing logic may determine the area of interest is included within the area of the shape with the highest rating.

In one embodiment, the processing logic may further define the area of interest. The processing logic may identify a portion of the image within the geometric shape to be the area of interest. In one embodiment, the processing logic may determine the area of interest includes a height between 0.5 mm and 1.5 mm and a width between 1.5 mm and 4.5 mm. In another embodiment, the processing logic may determine the area of interest includes a height of 1 mm and a width of 3 mm.

At block 616, the image may be cropped to exclude the region of the image outside of the area of interest.

At block 618, the cropped image (or uncropped image) may be processed using a machine learning model (e.g., an artificial neural network) to identify manufacturing defects of a 3D printing process. In some embodiments, the model may be a trained machine learning model. Alternatively, or additionally, one or more image processing operations may be performed on the cropped image (or the uncropped image), and a result of the image processing operations may be compared to a set of defined rules.

In one embodiment, the machine learning model (or set of defined rules) may determine whether a particular type of layering defect is present by identifying a plurality of lines present within the area of interest. The plurality of lines may result from the manufacturing process (e.g., SLA) used to fabricate the 3D printed object. The set of defined rules may include an acceptable threshold number of lines that should be present in an area having a similar dimension to the area of interest. The processing logic may determine whether the number of lines within the area of interest is within the acceptable threshold. If the processing logic determines that the number of lines is not within the acceptable threshold, the machine learning model may indicate the area of interest as containing a defect. The processing logic may additionally determine the severity of the defect and the likelihood that the layering defect could cause significant deformations. If the processing logic determines that the number of lines is within the acceptable threshold, the processing logic may indicate the area of interest as not containing the particular type of layering defect.

In another embodiment, the set of defined rules may include an acceptable threshold of distance between lines, where each line represents a different layer generated during the 3D printing process. The processing logic may determine whether the distance between the lines within the area of interest is within the acceptable threshold. If the processing logic determines that the distance between lines is not within the acceptable threshold, the processing logic may indicate the area of interest as containing a layering defect. The processing logic may additionally determine the severity of the defect and the likelihood that the defect could cause significant deformations. If the processing logic determines the distance between lines is within the acceptable threshold, the processing logic may indicate the area of interest as not containing a layering defect.

In another embodiment, the processing logic may determine whether a gap exists between the lines within the area of interest. If a gap exists between the lines, the processing logic may indicate the area of interest as containing a layering defect (e.g., an internal volume defect). The processing logic may additionally determine the severity of the layering defect (e.g., the amount of delamination) and the likelihood that the layering defect could cause significant deformations. If a gap does not exist between the lines, the processing logic may indicate the area of interest as not containing a layering defect.

The machine learning model may be trained to identify each of the above discussed types of defects based on a training dataset with labeled images of 3D printed objects that are defect free as well as labeled images of 3D printed objects that include these types of defects. Additionally, the machine learning model may be trained to identify other types of defects (e.g., other types of layering defects). For example, the machine learning model may determine whether debris, air bubbles (voids) or holes (pitting) are present within the area of interest. If debris or holes are present, the machine learning model may indicate the area of interest as containing a layering defect (e.g., a surface defect or an interface defect), and may optionally indicate the type of layering defect and/or the coordinates on the image where the layering defect was detected. The machine learning model may additionally determine a severity of the layering defect and the likelihood that the layering defect could cause significant deformations. If debris or holes are not present, the machine learning model may indicate the area of interest as not containing a layering defect.

The machine learning model may generate an output to be processed by the processing logic. In one embodiment, the output to the machine learning model may include a probability that the image includes a layering defect. In one embodiment, the output includes, for each type of defect that the machine learning model has been trained to detect, the probability that a defect of that type is included in the image. In another embodiment, the output of the machine learning model may include a defect rating indicating the severity of a defect identified in the image. In another embodiment, the output of the machine learning model may include an identification of a location within the image where a layering defect was identified. The output may further include a highlight of the location of the defect in the image.

The machine learning model may be composed of a single level of linear or non-linear operations (e.g., a support vector machine (SVM) or a single level neural network) or may be a deep neural network that is composed of multiple levels of non-linear operations. Examples of deep networks and neural networks include convolutional neural networks and/or recurrent neural networks with one or more hidden layers.

Some neural networks may be composed of interconnected nodes, where each node receives input from a previous node, performs one or more operations, and sends the resultant output to one or more other connected nodes for future processing.

Convolutional neural networks include architectures that may provide efficient image recognition. Convolutional neural networks may include several convolutional layers and subsampling layers that apply filters to portions of the image of the text to detect certain features (e.g., defects). That is, a convolutional neural network includes a convolution operation, which multiplies each image fragment by filters (e.g., matrices) element-by-element and sums the results in a similar position in an output image.

Recurrent neural networks may propagate data forwards, and also backwards, from later processing stages to earlier processing stages. Recurrent neural networks include functionality to process information sequences and store information about previous computations in the context of a hidden layer. As such, recurrent neural networks may have a "memory".

Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize that the image contains a face or define a bounding box around teeth in the image. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

The machine learning model that identifies defects from images of 3D printed objects may be trained using a training dataset. Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available. The training dataset may include many images of 3D printed objects. Each image may include a label or target for that image. The label or target may indicate whether the image includes a defect, a type of defect, a location of one or more defects, a severity of defect, and/or other information.

In one embodiment, training of the machine learning model is ongoing. Accordingly, as new images are generated, the machine learning model may be applied to identify defects in those images. In some instances a part may be based on the output of the machine learning model, but the part may ultimately fail due to undetected defects. This information may be added to the images that were processed, and those images may be fed back through the machine learning model in an updated learning process to further teach the machine learning model and reduce future false negatives.

At block 620, it is determined by the processing logic whether the 3D printed object includes a layering defect, and/or whether the 3D printed object includes one or more layering defects that will adversely affect use of the 3D printed object for its intended purpose. The processing logic may evaluate the machine learning model output for the image, as well as all other images of the plurality of images in accordance with methods described above. In one embodiment, the output generated by the machine learning model may include the defect rating for each defect identified in each image of the plurality of images. The processing logic may compare the output of the machine learning model (e.g., the defect ratings) to a defect threshold. In one embodiment, the processing logic may compare the output for each image to the defect threshold. In another embodiment, the processing logic may generate an overall combined defect rating for the plurality of images and compare the overall combined defect rating to the defect threshold. If the output is above the defect threshold, the processing logic may determine that a layering defect is identified in the images associated with the 3D printed object, and the method 600 may continue to block 622. If the output is below the defect threshold, the processing logic may determine that a manufacturing defect is not identified in the 3D printed object, and the method 600 may terminate.

If it is determined by the processing logic that the 3D printed object includes a manufacturing defect, at block 622, the 3D printed object may be discarded. In one embodiment, the 3D printed object may be fixed to remove the layering defect. In another embodiment, the 3D printed object may be scrapped and a replacement 3D printed object may be manufactured.

Figure 7:
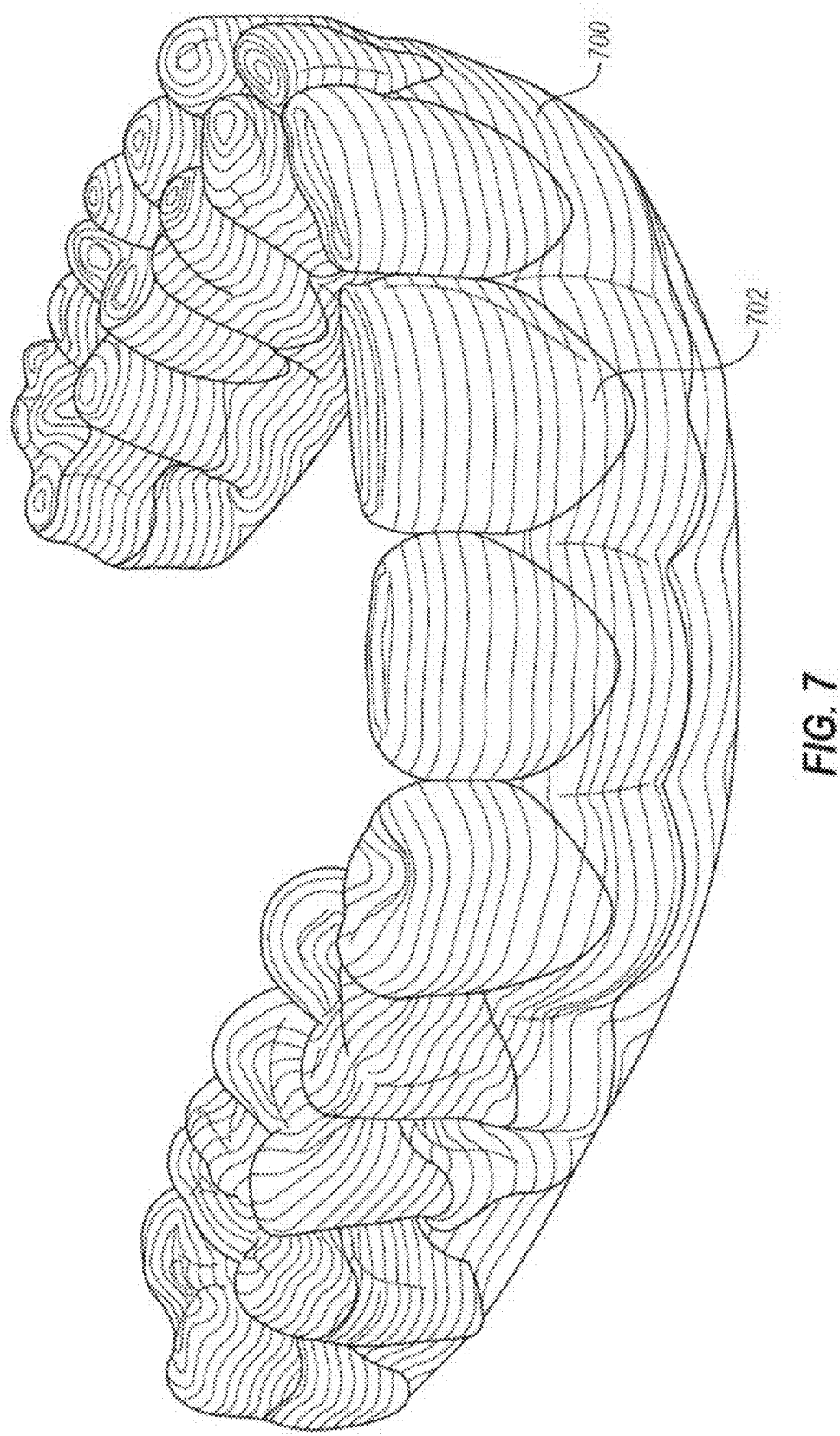
FIG. 7 illustrates a 3D printed object, including layers resulting from a 3D printing process, in accordance with one embodiment.

FIG. 7 illustrates a 3D printed object 700, including a plurality of lines 702 formed as a result of a 3D printing process, in accordance with one embodiment. In one embodiment, the 3D printed object may comprise a mold of a dental arch used to fabricate an orthodontic and/or polymeric aligner. In some instances, SLA is used to fabricate the mold. As a result of the SLA process, a 3D printed object 700 may include a plurality of lines 702 indicating the thin layers formed during the SLA process.

Figure 8C:
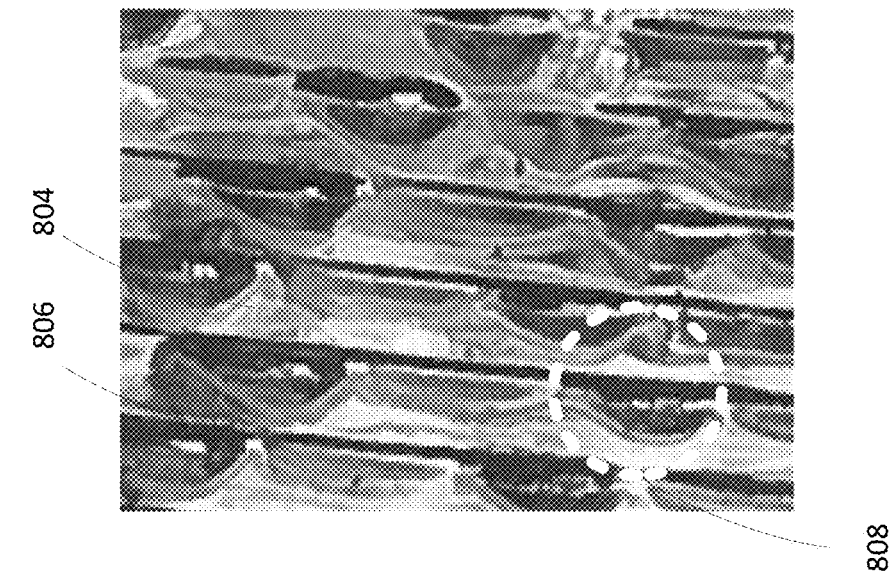
FIG. 8C illustrates an exploded view of a distinct region of the 3D printed object illustrated in FIG. 8A, wherein the 3D printed object contains a layering defect, in accordance with one embodiment.
Figure 8B:
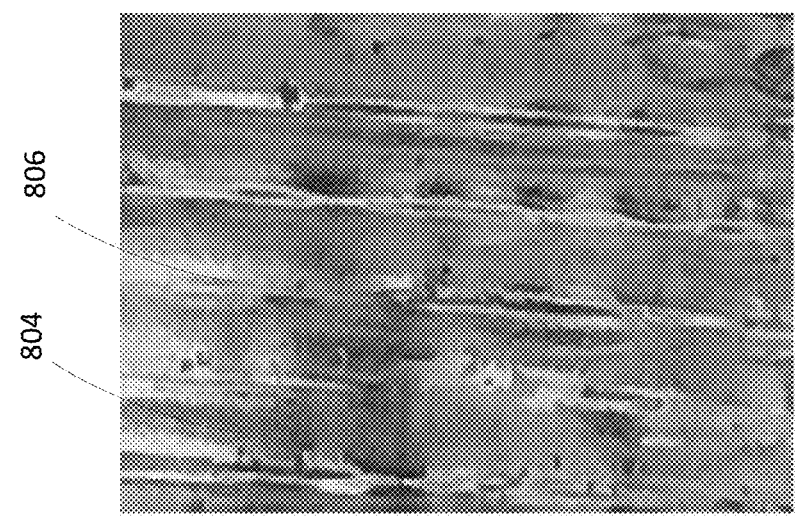
FIG. 8B illustrates an exploded view of a distinct region of the 3D printed object illustrated in FIG. 8A, wherein the 3D printed object does not contain a layering defect, in accordance with one embodiment.
Figure 8A:
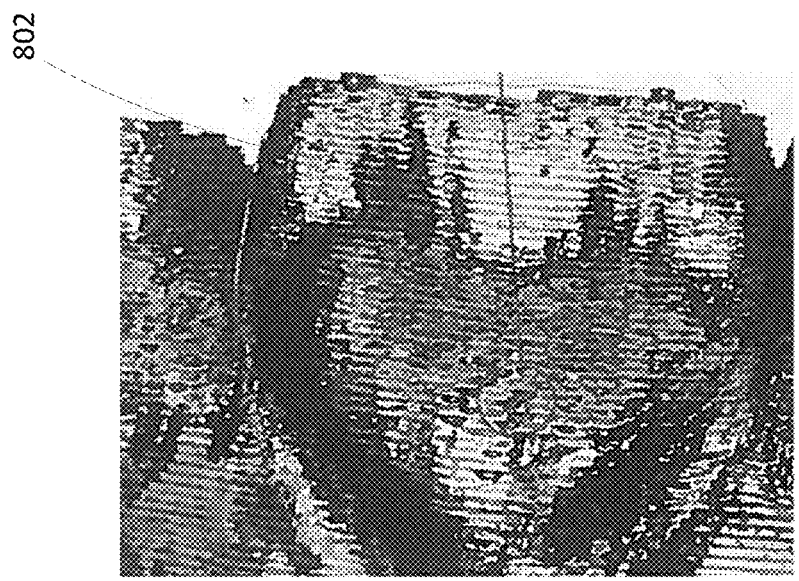
FIG. 8A illustrates an image of a 3D printed object generated by an imaging system depicted in FIGS. 1A, 1B, 2A and/or 2B, in accordance with one embodiment.

FIG. 8A illustrates an image of a 3D printed object generated by an imaging system depicted in FIG. 1A, 1B, 2A or 2B, in accordance with one embodiment. The image may depict a distinct region 802 of the 3D printed object. In one embodiment, the 3D printed object may depict a mold for an orthodontic or polymeric aligner, as seen in one embodiment of FIG. 7, and the distinct region 802 may include a tooth of the mold. The distinct region 802 may include a plurality of thin layers formed by a layer-by-layer 3D printing process (e.g., SLA).

FIG. 8B illustrates an exploded view of the distinct region 802 from the 3D printed object of FIG. 8A. The distinct region 802 includes a plurality of thin layers 804 formed during a layer-by-layer 3D printing process (e.g., SLA). The space between the thin layers 804 is depicted as a plurality of lines 806. FIG. 8B illustrates an ideal view of a 3D printed object fabricated by a layer-by-layer SLA process. The thin layers 804 do not contain any layering defects caused by a manufacturing malfunction. Additionally, the lines 806 are spaced evenly apart, indicating that the thin layers 804 have an equal thickness.

FIG. 8C illustrates another exploded view of the distinct region 802 for the 3D printed object of FIG. 8A. FIG. 8C depicts a plurality of layering defects 808 in the form of holes (e.g., pits) formed on the surface to interior interface of the mold.

FIG. 9 illustrates an example user interface (UI) 900 for system control and image acquisition (e.g., for software and/or firmware comprising image inspection module 145 and/or imager control module 140 of FIG. 1A), in accordance with one embodiment. The UI 900 may be interactive, and user interactive options may be represented as icons. The user may interact with the UI by various input (e.g., mouse, keyboard, touchscreen, or other similar devices).

An overhead view area 902 may be provided in one section of UI 900. The overhead view area 902 may be configured to display an image of a 3D printed object. The image of the 3D printed object may be generated by a camera of the imaging system depicted in FIGS. 1A, 1B, 2A and/or 2B. The image may be generated by a top view camera depicted in FIG. 1A, 2A or 2B, for example. The image displayed in the overhead view area 902 may depict a top view image of the 3D printed object captured by the top view camera.

An inspection view area 904 may be provided in one section of the UI 900. The inspection view area 904 may be configured to display a different image of the 3D printed object than the image displayed in the overhead view area 902. The image displayed in the inspection view area 904 may be generated by a side view camera of the imaging system depicted in FIGS. 1A, 1B, 2A and/or 2B. In one embodiment, the side view camera may be configured to acquire side view images of the 3D printed object. The image displayed in the inspection view area 904 may depict a side view image captured by the side view camera. The image may depict a distinct region of the 3D printed object and may depict the thin layers formed by a layer-by-layer 3D printing process (e.g., SLA). In one embodiment, the UI 900 may include a zoom fit 918 icon, which may allow a user to automatically zoom in on the image displayed in the inspection view area 904 and may fit the zoomed in portion of the image to the bounds of the inspection view area 904.

An image menu 906 may be provided in one section of the UI 900. Each entry of the image menu 906 may include an image depicting a distinct region of the 3D printed object that is depicted in the images displayed in the overhead view area 902 and the inspection view area 904. Each entry may further include a fail indicator which indicates whether the distinct region depicted in the corresponding image contains one or more defects and subsequently fails inspection. If a user selects an entry of the image menu 906, the image associated with the entry may be displayed in the inspection view area 904. In one embodiment, the image displayed in the inspection view area 904 may further include a visual indicator that identifies for the user the exact location of the defect on the distinct region of the 3D printed object.

A result area 908 may be provided in one section of the UI 900. The result area 908 may display output results generated from a machine learning model and/or a set of rules applied by a rules engine. The results area 908 may indicate whether an image of the 3D printed object has been generated and has been successfully processed by the machine learning model. In one embodiment, the overhead view area 902 may include an image depicting a top view of the 3D printed object. In a further embodiment, the result area 908 may indicate whether an ID associated with the 3D printed object was successfully identified. The results area 908 may further indicate whether a gross defect is present on the 3D printed object. If a gross defect is present on the 3D printed object, results area 908 may indicate that a profile of the object fails inspection. The results area 908 may further indicate whether a layering defect is present in the 3D printed object. If a layering defect is present in the 3D printed object, the results area 908 may indicate that the 3D printed object fails inspection.

In one embodiment, UI 900 may include a fail indicator 910. The fail indicator 910 may indicate to a user that the 3D printed object has failed inspection by containing a manufacturing defect that will degrade performance of the 3D printed object (e.g., a gross defect a layering defect, etc.). The fail indicator 910 may indicate that the 3D printed object has failed inspection based on the results provided in the results area 908. In one embodiment, the fail indicator 910 may include an icon wherein a user (e.g., a technician) selecting the icon may manually fail the inspection of the 3D printed object based on the images displayed in the overhead view area 902 and the inspection view area 904.

A statistics area 912 may be provided in one section of the UI 900. The statistics area 912 may provide statistics based on the total number of 3D printed objects tested in a given set of 3D printed objects. The statistics area 912 may indicate a number of images of a 3D printed object that have passed inspection and a number of images of the 3D printed object that have failed inspection. The statistics area 912 may further include the yield of images tested for the given 3D printed object. The UI 900 may further include a statistics reset button 914. A user (e.g., a technician) may reset the statistics area 912 such that the total number of images tested for a given set of images is set to zero.

An ID entry 916 may be provided in one section of the UI 900. In one embodiment, a user (e.g., a technician) may manually enter an ID (e.g., a serial number) associated with the 3D printed object depicted in the images displayed in the overhead view area 902 and the inspection view area 904 into the ID entry 916. In another embodiment, the ID may be automatically populated into the ID entry 916 by the processing logic of the imaging system depicted in FIGS. 1A, 1B, 2A and/or 2B. In one embodiment, OCR may be performed on the image displayed in the overhead view area 902 to identify a symbol sequence in the image, and the processing logic may generate an ID associated with the 3D printed object. The ID may be obtained based on a known order of the 3D printed object in an object sorting system, as described in embodiments herein.

Icons for a manual mode 920 and an automatic mode 922 may be provided in one section of the UI 900. In one embodiment, the manual mode 920 icon may be selected by a user (e.g., a technician). If the manual mode 920 icon is selected, the user may manually inspect the 3D printed object depicted in the images displayed in the overhead view area 902 and the inspection view area 904. The fail indicator 910 may include a button wherein the user may manually fail the inspection of the 3D printed object based on the images. In another embodiment, the automatic mode 922 icon may be selected. If the automatic mode 922 icon is selected, the processing logic may cause the machine learning logic to process the images displayed in the overhead view area 902 and the inspection view area 904 so to determine whether a manufacturing defect is present.

An icon for image capture 924 may be provided in one section of the UI 900. In one embodiment, a user (e.g., a technician) may manually capture images of the 3D printed object by selecting the image capture 924 icon. In another embodiment, the processing logic may cause at least one image of the 3D printed object to be captured in accordance to methods disclosed herein.

Icons for settings 928, diagnostics 930, emergency stop 932 and exit 934 may be provided in one section of the UI 900. In one embodiment, a user (e.g., a technician) may select the diagnostics 930 icon to modify the parameters of the imaging system depicted in FIGS. 1A, 1B, 2A and/or 2B, in accordance with UI 1000 depicted in FIG. 10. In one embodiment, the user may stop the imaging system from capturing images of the 3D printed object by selecting the emergency stop 932 icon. The user may modify the settings of the program displaying the UI 900 by selecting the settings 928 icon. The user may exit the program displaying the UI 900 by selecting the exit 934 icon.

Figure 10:
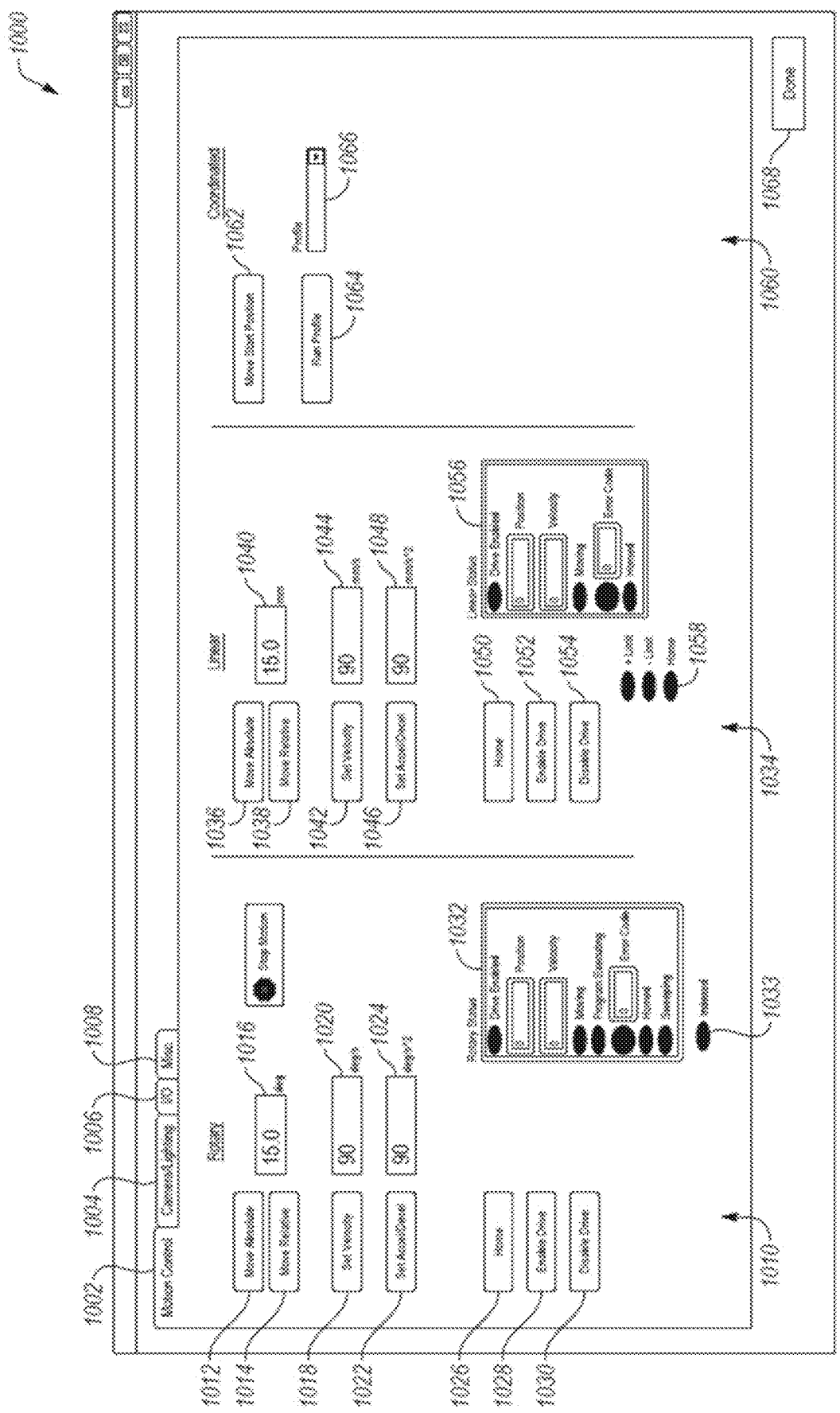
FIG. 10 illustrates an example UI for engineering control functions of an imager control module, in accordance with one embodiment.

FIG. 10 illustrates an example UI 1000 for engineering control for the imaging system depicted in FIGS. 1A, 1B, 2A and/or 2B, in accordance with one embodiment. UI 1000 may be displayed to a user (e.g., a technician) if the user selects the diagnostics 930 icon depicted in FIG. 9. The UI 1000 may be interactive, and user interactive options may be represented as icons. The user may interact with the UI by various input (e.g., mouse, keyboard, touchscreen, or other similar devices). In one embodiment, the UI 1000 is a UI of the imager control module 140 of FIG. 1A.

Icons for a motion control menu 1002, camera/lighting menu 1004, I/O menu 1006, and a miscellaneous menu 1008 may be provided on the UI 1000. A user (e.g., a technician) may adjust various parameters associated with different components of the imaging system depicted in FIGS. 1A and 1B by selecting an icon associated with a component. For example, the user may adjust the parameters regarding the motion control of the multi-axis platform of the platform apparatus, or the moveable base of the side view camera apparatus depicted in FIGS. 1A and 1B by selecting the motion control menu 1002 icon. The motion control menu 1002 is highlighted in FIG. 10.

A rotary control area 1010 may be provided in one section of the UI 1000. The rotary control area 1010 may allow the user to modify the parameters associated with the platform of the platform apparatus. In one embodiment, the user may modify the degree of rotation of the platform by entering a numerical value into a degree entry field 1016. In a further embodiment, the user may modify the degree of rotation of the platform absolutely (e.g., to select a particular rotation position setting) by selecting a move absolute 1012 icon. In another embodiment, the user may modify the degree of rotation of the platform relative to a previous degree of rotation by selecting a move relative 1014 icon. In one embodiment, the user may modify the velocity of the platform rotation and/or translational motion by entering a numerical value into a velocity entry field 1020 and selecting a set velocity 1018 icon. In another embodiment, the user may modify the acceleration of the platform rotation and/or translational motion by entering a numerical value into an acceleration entry field 1024 and selecting a set acceleration/deceleration 1022 icon. If the user enters a positive numerical value into the acceleration entry field 1024, the platform may increase acceleration. If the user enters a negative numerical value into the acceleration entry field 1024, the platform may decrease acceleration. In one embodiment, the user may stop the rotation and/or translational motion of the platform by selecting a stop motion 1025 icon.

Icons to return home 1026, enable drive 1028, or disable drive 1030 may be included in the rotary control area 1010. A user may cause the platform to return to a "home" setting by selecting the home 1026 icon. The "home" setting may include a set of parameters for the base that are applied when each 3D printed object is first processed. A user may enable drive of the platform (e.g., to begin rotation and/or translational motion) by selecting the enable drive 1028 icon. A user may disable drive of the (e.g., to stop rotation and/or translational motion) by selecting the disable drive 1030 icon.

The rotary control area 1010 may also include a rotary status area 1032. The rotary status area 1032 may indicate the current parameters and the status of the platform. In one embodiment, the rotary status area 1032 may indicate whether drive is enabled, the platform is moving, a program is executing, or the platform is set to a "home" setting. In a further embodiment, the rotary status area 1032 may provide the current degree position of the platform and the current velocity of which the platform is rotating. In one embodiment, if an error has occurred in operation platform, an error code may be provided in the rotary status area 1032.

A linear control area 1034 may be provided in one section of the UI 1000. The linear control area 1034 may allow a user (e.g., a technician) to modify the parameters associated with the moveable base of the side view camera apparatus depicted in FIGS. 1A and 1B. In one embodiment, the user may modify the location of the moveable base by entering a numerical value into a location entry field 1040. In a further embodiment, the user may modify the location of the moveable base absolutely by selecting a move absolute 1036 icon. In another embodiment, the user may modify the location of the moveable base relative to a previous location by selecting a move relative 1038 icon. In one embodiment, the user may modify the velocity the moveable base moves by entering a numerical value into a velocity entry field 1044 and selecting the set velocity 1042 icon. In another embodiment, the user may modify the acceleration of the moveable base by entering a numerical value into an acceleration entry field 1048 and selecting a set acceleration/deceleration 1049 icon. If the user enters a positive numerical value into the acceleration entry field 1024, the moveable base may increase acceleration. If the user enters a negative numerical value into the acceleration entry field 1024, the moveable base may decrease acceleration.

Icons to return home 1050, enable drive 1052, or disable drive 1054 may be included in the linear control area 1034. A user may cause the moveable base to return to a "home" setting by selecting the home 1050 icon. The "home" setting may include a set of parameters for the moveable base that are applied when each 3D printed object is first processed. A user may enable drive of the moveable base by selecting the enable drive 1052 icon. A user may disable drive of the moveable base by selecting the disable drive 1058 icon.

The linear control area 1034 may also include a linear status area 1056. The linear status area 1056 may indicate the current parameters and the status of the moveable base. In one embodiment, the linear status area 1056 may indicate whether a drive is enabled, the moveable base is moving, or the moveable base is set to a "home" setting. In a further embodiment, the rotary status area 1032 may provide the current location of the moveable base and the current velocity of which the moveable base is moving. In one embodiment, if an error has occurred in operation of the moveable base, an error code may be provided in the linear status area 1056.

A coordinated control area 1060 may be provided in one section of the UI 1000. The coordinated control area 1060 may allow a user (e.g., a technician) to cause the processing logic to automatically modify the parameters associated with the platform of the platform apparatus, and the moveable base of the side view camera apparatus depicted in FIGS. 1A and 1B (e.g., according to some inspection recipe). A user may cause the processing logic to move the start position of the platform of the platform apparatus and/or the moveable base of the side view camera apparatus by selecting a move start position 1062 icon. A user may cause the processing logic to determine a motion profile for the 3D printed object under inspection by selecting a run profile 1064 icon. A motion profile may be determined by the processing logic in accordance with one or more properties associated with the 3D printed object. The one or more properties may be stored in a digital file associated with the 3D printed object. In one embodiment, a user may select a previously generated motion profile from a plurality of motion profiles from a profile drop down menu 1066.

After a user has modified at least one parameter in one or more of the rotary control area 1010, the linear control area 1034, and/or the coordinated control area, the user may apply the modified parameters to the imaging system by selecting a done 1068 icon. The UI 900 depicted in FIG. 9 may be presented to the user upon selection of the done 1068 icon.

Figure 11:
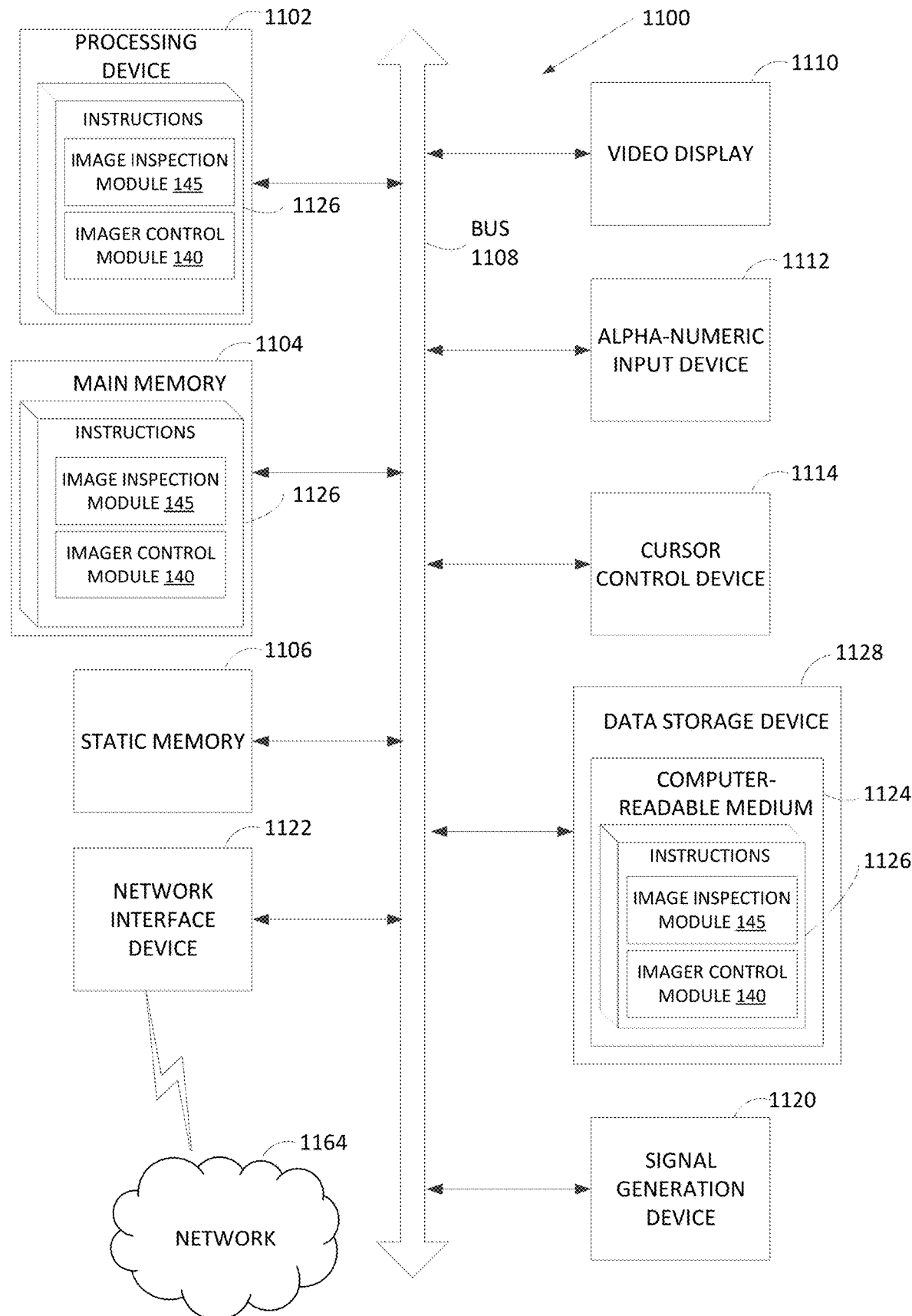
FIG. 11 illustrates a block diagram of an example computing device, in accordance with embodiments.

FIG. 11 illustrates a diagrammatic representation of a machine in the example form of a computing device 1100 within which a set of instructions, for causing the machine to perform any one or more of the methodologies discussed with reference to the methods of FIGS. 3A-6. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. In another example, the machine may be networked to or directly connected to an imaging system (e.g., imaging system 101 of FIGS. 1A, 1B, 2A and/or 2B. In one embodiment, the computing device 1100 corresponds to the computing device 135 of FIG. 1A. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1100 includes a processing device 1102, a main memory 1104 (e.g., read only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1128), which communicate with each other via a bus 1108.

Processing device 1102 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute the processing logic (instructions 1126) for performing operations and steps discussed herein.

The computing device 1100 may further include a network interface device 1122 for communicating with a network 1164. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1128 may include a machine-readable storage medium (or more specifically a non-transitory computer-readable storage medium) 1124 on which is stored one or more sets of instructions 1126 embodying any one or more of the methodologies or functions described herein. A non-transitory storage medium refers to a storage medium other than a carrier wave. The instructions 1126 may also reside, completely or at least partially, within the main memory 1104 and/or within the processing device 1102 during execution thereof by the computer device 1100, the main memory 1104 and the processing device 1102 also constituting computer-readable storage media.

The computer-readable storage medium 1124 may also be used to an image inspection module 145 and/or imager control module 140 as described herein above, which may perform one or more of the operations of methods described with reference to FIGS. 3A-6. The computer readable storage medium 1124 may also store a software library containing methods that call an image inspection module 145 and/or imager control module 140. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium"

shall accordingly be taken to include, but not be limited to, solid-state memories, and optical and magnetic media, and other non-transitory computer-readable media.

Figure 12A:
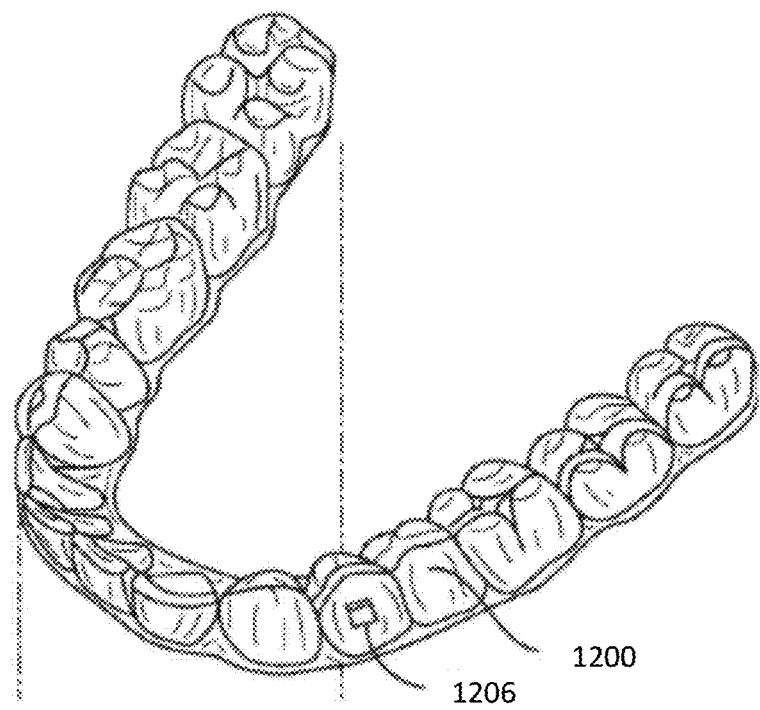
FIG. 12A illustrates a tooth repositioning appliance, in accordance with embodiments.
Figure 12A:
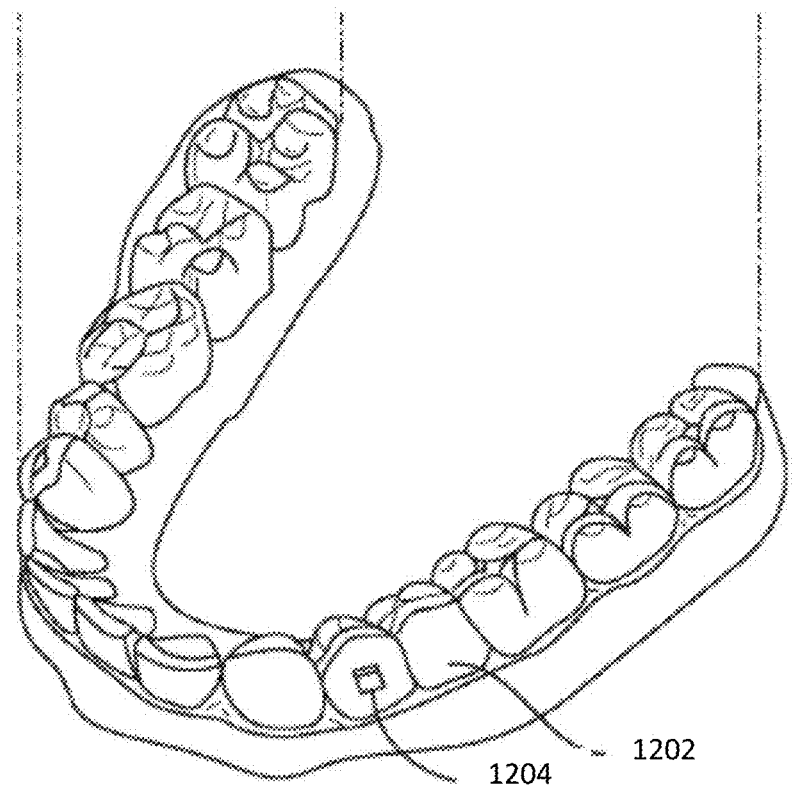

As discussed herein above, in some embodiments, the defect detection systems of FIGS. 1A, 2A and 2B and methods 300-600 of FIGS. 3A-6 may be used to perform automated defect detection of molds of dental arches used to manufacture aligners and/or to perform automated defect detection of directly printed aligners. FIG. 12A illustrates an exemplary tooth repositioning appliance or aligner 1200 that can be worn by a patient in order to achieve an incremental repositioning of individual teeth 1202 in the jaw. The appliance can include a shell (e.g., a continuous polymeric shell or a segmented shell) having teeth-receiving cavities that receive and resiliently reposition the teeth. An aligner (also referred to as an appliance) or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal or greater than 3 repeating units, optionally, in some embodiments equal to or greater than 10 repeating units, in some embodiments greater or equal to 30 repeating units) and a high molecular weight (e.g., greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, polypropylenes, polyethylenes, polyethylene terephthalates, poly lactic acid, polyurethanes, epoxide polymers, polyethers, poly(vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not inclusive, but rather is exemplary. The plastics can be thermosets or thermoplastics. The plastic may be thermoplastic.

Examples of materials applicable to the embodiments disclosed herein include, but are not limited to, those materials described in the following Provisional patent applications filed by Align Technology: "MULTIMATERIAL ALIGNERS," U.S. Prov. App. Ser. No. 62/189,259, filed Jul. 7, 2015; "DIRECT FABRICATION OF ALIGNERS WITH INTERPROXIMAL FORCE COUPLING", U.S. Prov. App. Ser. No. 62/189,263, filed Jul. 7, 2015; "DIRECT FABRICATION OF ORTHODONTIC APPLIANCES WITH VARIABLE PROPERTIES," U.S. Prov. App. Ser. No. 62/189,291, filed Jul. 7, 2015; "DIRECT FABRICATION OF ALIGNERS FOR ARCH EXPANSION", U.S. Prov. App. Ser. No. 62/189,271, filed Jul. 7, 2015; "DIRECT FABRICATION OF ATTACHMENT TEMPLATES WITH ADHESIVE," U.S. Prov. App. Ser. No. 62/189,282, filed Jul. 7, 2015; "DIRECT FABRICATION CROSS-LINKING FOR PALATE EXPANSION AND OTHER APPLICATIONS", U.S. Prov. App. Ser. No. 62/189,301, filed Jul. 7, 2015; "SYSTEMS, APPARATUSES AND METHODS FOR DENTAL APPLIANCES WITH INTEGRALLY FORMED FEATURES", U.S. Prov. App. Ser. No. 62/189,312, filed Jul. 7, 2015; "DIRECT FABRICATION OF POWER ARMS", U.S. Prov. App. Ser. No. 62/189,317, filed Jul. 7, 2015; "SYSTEMS, APPARATUSES AND METHODS FOR DRUG DELIVERY FROM DENTAL APPLIANCES WITH INTEGRALLY FORMED RESERVOIRS", U.S. Prov. App. Ser. No. 62/189,303, filed Jul. 7, 2015; "DENTAL APPLIANCE HAVING ORNAMENTAL DESIGN", U.S. Prov. App. Ser. No. 62/189,318, filed Jul. 7, 2015; "DENTAL MATERIALS USING THERMOSET POLYMERS," U.S. Prov. App. Ser. No. 62/189,380, filed Jul. 7, 2015; "CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THEREFROM," U.S. Prov. App. Ser. No. 62/667,354, filed May 4, 2018; "POLYMERIZABLE MONOMERS AND METHOD OF POLYMERIZING THE SAME," U.S. Prov. App. Ser. No. 62/667,364, filed May 4, 2018; and any conversion applications thereof (including publications and issued patents), including any divisional, continuation, or continuation-in-part thereof.

The appliance 1200 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved an also serve as a base or anchor for holding the appliance in place over the teeth. In some cases, however, it may be desirable or necessary to provide individual attachments or other anchoring elements 1204 on teeth 1202 with corresponding receptacles or apertures 1206 in the appliance 1200 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 12B:
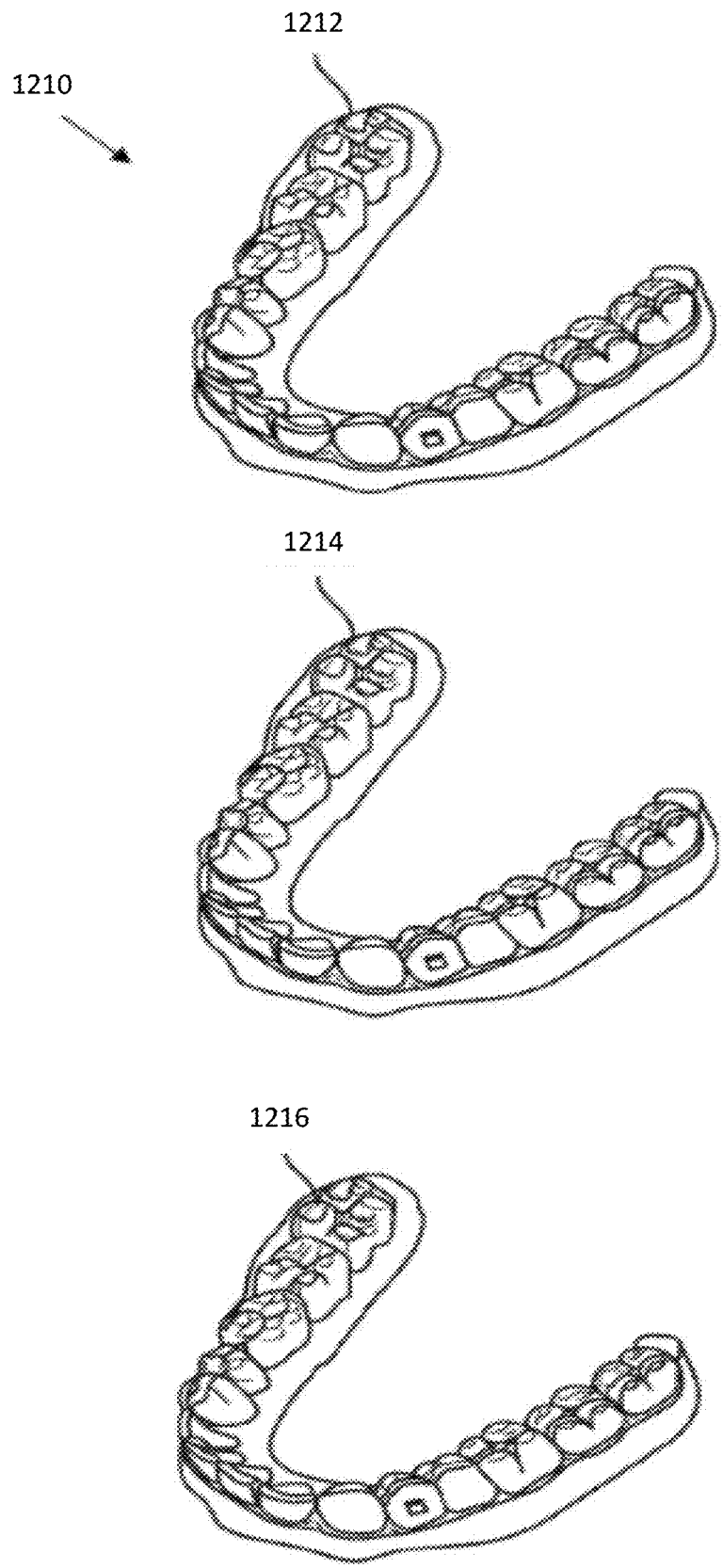
FIG. 12B illustrates a tooth repositioning system, in accordance with embodiments.

FIG. 12B illustrates a tooth repositioning system 1210 including a plurality of appliances 1212, 1214, and 1216. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1210 can include a first appliance 1212 corresponding to an initial tooth arrangement, one or more intermediate appliances 1214 corresponding to one or more intermediate arrangements, and a final appliance 1216 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 1212, 1214, 1216, or portions thereof, can be produced using indirect fabrication techniques, such as thermoforming over a positive or negative mold, which may be inspected using the methods and systems described herein above. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be formed by a rapid prototyping machine (e.g., a SLA 3D printer). The rapid prototyping machine may receive digital models of molds of dental arches and/or digital models of the appliances 1212, 1214, 1216 after the digital models of the appliances 1212, 1214, 1216 have been processed by processing logic of a computing device. The processing logic may include hardware (e.g., circuitry, dedicated logic, programming logic, microcode, etc.), software (e.g., instructions executed by a processing device), firmware, or a combination thereof.

To manufacture the molds, a shape of a dental arch for a patient at a treatment stage is determined based on a treatment plan. In the example of orthodontics, the treatment plan may be generated based on an intraoral scan of a dental arch to be molded. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting technologies (e.g., to design the virtual 3D mold). Alternatively, an initial negative mold may be generated from an actual to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model will be different. The original virtual 3D model, the final virtual model 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specific geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances SLA is used to fabricate an SLA mold. In SLA, the mold is fabricated by successively printing thin layers of a photo-curable material (e.g., a polymeric resin) on top of one another. A platform rests in a bath of liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as polyester, a co-polyester, a polycarbonate, a thermopolymeric polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermopolymeric elastomer (TPE), a thermopolymeric vulcanizate (TPV) elastomer, a polyurethane elastomer, a block copolymer elastomer, a polyolefin blend elastomer, a thermopolymeric co-polyester elastomer, a thermopolymeric polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

After the mold is generated, it may be inspected using the systems and/or methods described herein above. If the mold passes the inspection, then it may be used to form an appliance (e.g., an aligner).

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 1212, 1214, and 1216 can be pressure formed or thermoformed over the molds. Each mold may be used to fabricate an appliance that will apply forces to the patient's teeth at a particular stage of the orthodontic treatment. The appliances 1212, 1214, and 1216 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell.

Additional information may be added to the appliance. The additional information may be any information that pertains to the aligner. Examples of such additional information includes a part number identifier, patient name, a patient identifier, a case number, a sequence identifier (e.g., indicating which aligner a particular liner is in a treatment sequence), a date of manufacture, a clinician name, a logo and so forth. For example, after an appliance is thermoformed, the aligner may be laser marked with a part number identifier (e.g., serial number, barcode, or the like). In some embodiments, the system may be configured to read (e.g., optically, magnetically, or the like) an identifier (barcode, serial number, electronic tag or the like) of the mold to determine the part number associated with the aligner formed thereon. After determining the part number identifier, the system may then tag the aligner with the unique part number identifier. The part number identifier may be computer readable and may associate that aligner to a specific patient, to a specific stage in the treatment sequence, whether it is an upper or lower shell, a digital model representing the mold the aligner was manufactured from and/or a digital file including a virtually generated digital model or approximated properties thereof of that aligner (e.g., produced by approximating the outer surface of the aligner based on manipulating the digital model of the mold, inflating or scaling projections of the mold in different planes, etc.).

After an appliance is formed over a mold for a treatment stage, that appliance is subsequently trimmed along a cutline (also referred to as a trim line) and the appliance may be removed from the mold. The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances 1212, 1214, and 1216. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances 1212, 1214, and 1216 can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances 1212, 1214, and 1216 can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances 1212, 1214, and 1216. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances 1212, 1214, and 1216 are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every nth build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, and then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Once appliances (e.g., aligners) are directly fabricated, they may be inspected using the systems and/or methods described herein above.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 13:
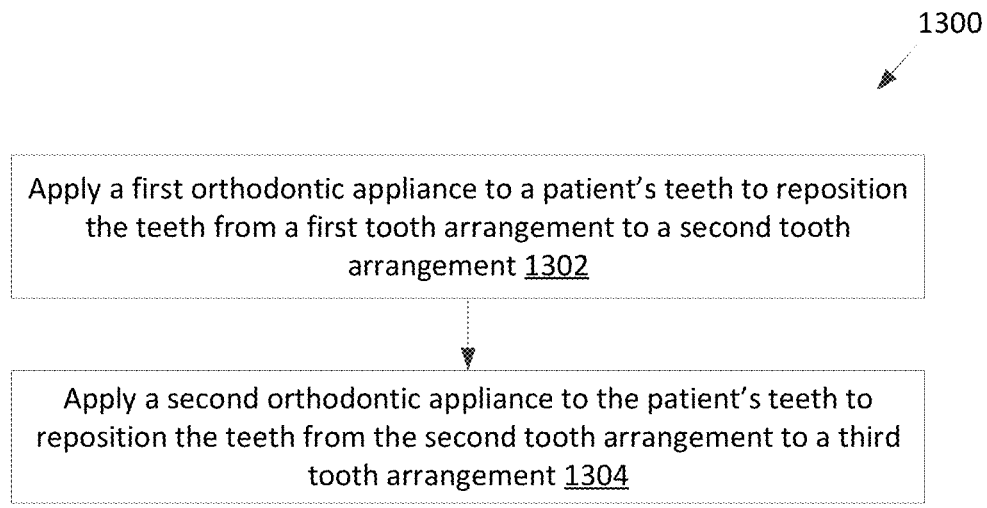
FIG. 13 illustrates a method of orthodontic treatment using a plurality of appliances, in accordance with embodiments.

FIG. 13 illustrates a method 1300 of orthodontic treatment using a plurality of appliances, in accordance with embodiments. The method 1300 can be practiced using any of the appliances or appliance sets described herein. In block 1302, a first orthodontic appliance is applied to a patient's teeth in order to reposition the teeth from a first tooth arrangement to a second tooth arrangement. In block 1304, a second orthodontic appliance is applied to the patient's teeth in order to reposition the teeth from the second tooth arrangement to a third tooth arrangement. The method 1300 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 14:
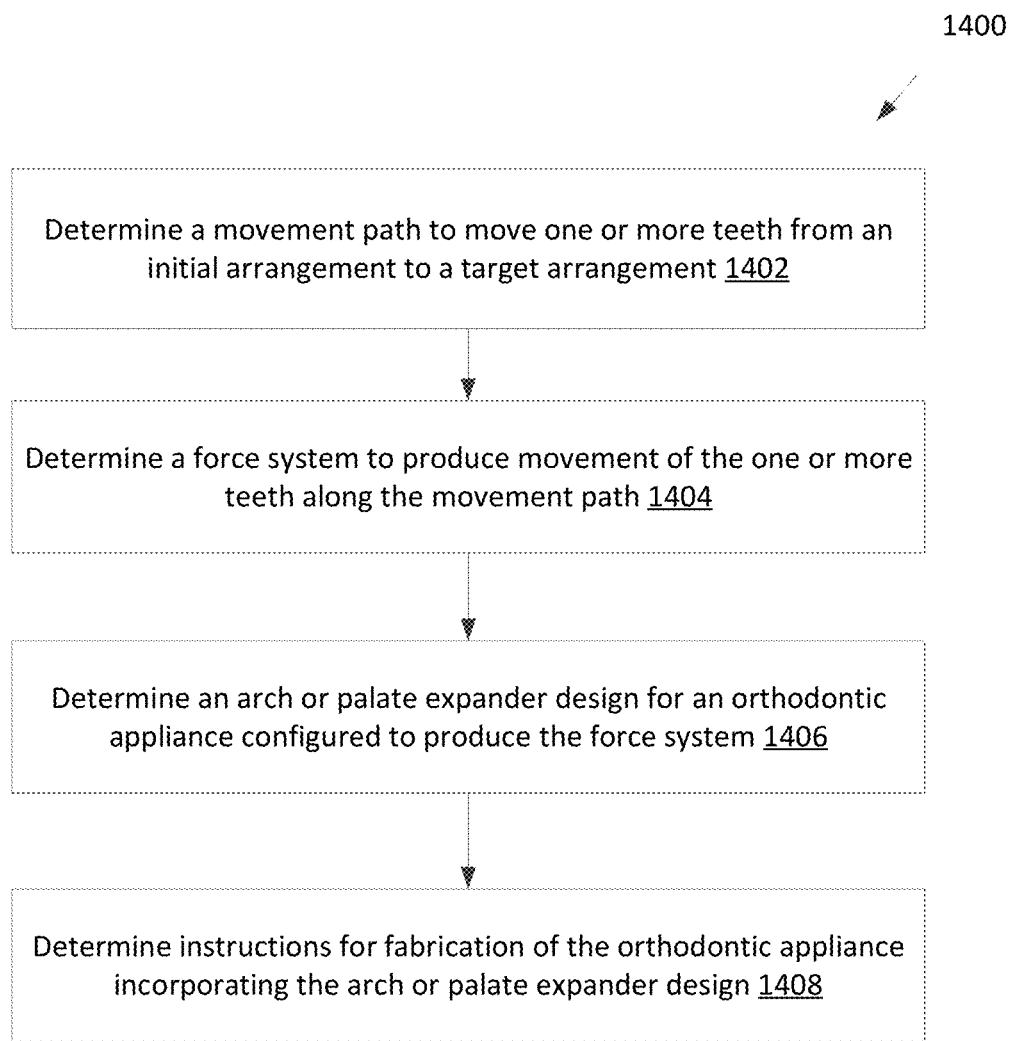
FIG. 14 illustrates a method for designing an orthodontic appliance to be produced by direct fabrication, in accordance with embodiments.

FIG. 14 illustrates a method 1400 for designing an orthodontic appliance to be produced by direct fabrication, in accordance with embodiments. The method 1400 can be applied to any embodiment of the orthodontic appliances described herein. Some or all of the blocks of the method 1400 can be performed by any suitable data processing system or device, e.g., one or more processors configured with suitable instructions.

In block 1402, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1404, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 1406, an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1408, instructions for fabrication of the orthodontic appliance incorporating the orthodontic appliance are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 1400 may comprise additional blocks: 1) The upper arch and palate of the patient is scanned intraorally to generate three dimensional data of the palate and upper arch;

2) The three dimensional shape profile of the appliance is determined to provide a gap and teeth engagement structures as described herein.

Although the above blocks show a method 1400 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 1400 may be performed with any suitable fabrication system or device, such as the embodiments described herein. Some of the blocks may be optional, and the order of the blocks can be varied as desired.

Figure 15:
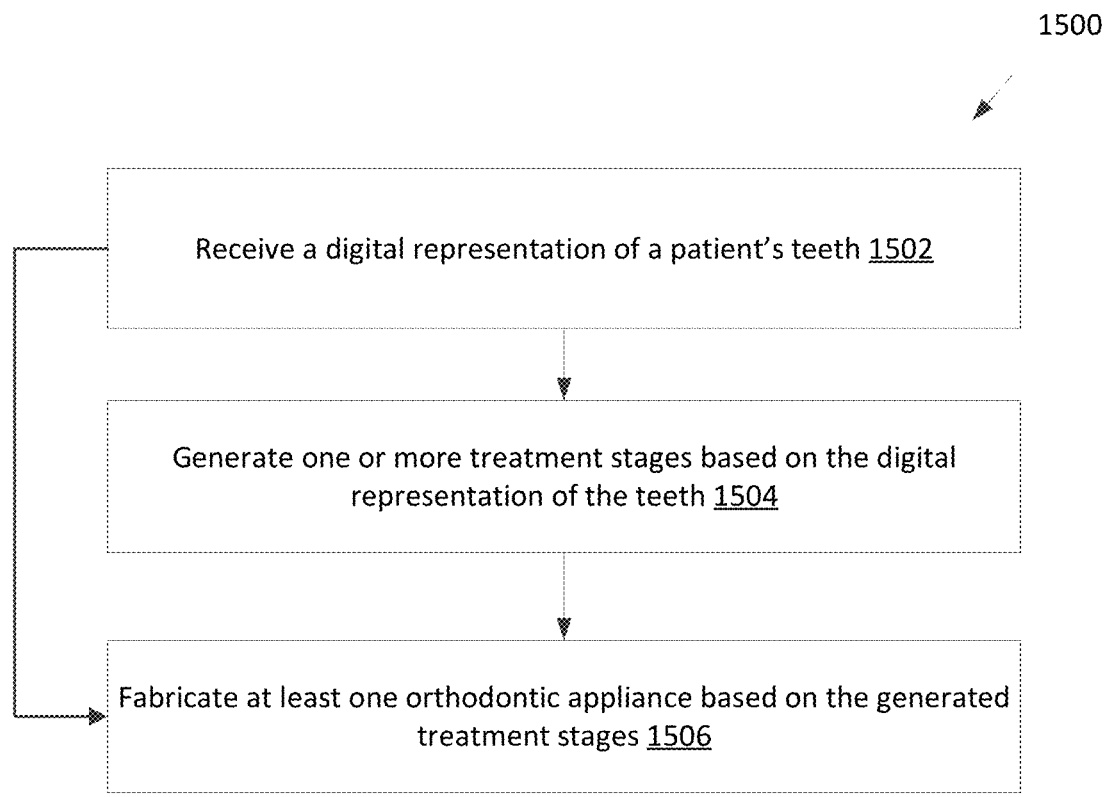
FIG. 15 illustrates a method for digitally planning an orthodontic treatment, in accordance with embodiments.

FIG. 15 illustrates a method 1500 for digitally planning an orthodontic treatment and/or design or fabrication of an appliance, in accordance with embodiments. The method 1500 can be applied to any of the treatment procedures described herein and can be performed by any suitable data processing system.

In block 1510, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1502, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1504, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. Design and/or fabrication of an orthodontic appliance, and perhaps a particular orthodontic treatment, may include use of a representation of the patient's teeth (e.g., receive a digital representation of the patient's teeth), followed by design and/or fabrication of an orthodontic appliance based on a representation of the patient's teeth in the arrangement represented by the received representation.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method of performing automated quality control for a three-dimensional (3D) printed mold for an orthodontic aligner, comprising:
generating a plurality of images of the 3D printed mold for the orthodontic aligner using one or more imaging devices, wherein each image of the plurality of images depicts a distinct region of the 3D printed mold for the orthodontic aligner;
processing the plurality of images by a processing device to identify one or more types of manufacturing defects of the 3D printed mold for the orthodontic aligner, wherein for each type of manufacturing defect a probability that an image comprises a defect of that type of manufacturing defect is determined; and
classifying, by the processing device, the 3D printed mold for the orthodontic aligner as defective based on identifying the one or more types of manufacturing defects.

2. The method of claim 1, wherein the processing is performed using a machine learning model trained to identify one or more types of manufacturing defects of a 3D printing process, wherein an output of the machine learning model comprises, for each type of manufacturing defect, a probability that an image of the plurality of images comprises a defect of that type of manufacturing defect.

3. The method of claim 1, further comprising:
determining, based at least in part of a severity of the one or more manufacturing defects, that the one or more manufacturing defects alone or together will degrade a performance of the 3D printed mold.

4. The method of claim 1, wherein the one or more types of manufacturing defect comprise at least an internal volume defect within an internal volume of the 3D printed mold.

5. The method of claim 1, wherein the one or more types of manufacturing defect comprise at least a surface defect on a surface of the 3D printed mold.

6. The method of claim 1, wherein the one or more types of manufacturing defect comprise at least an interface defect at an interface of an internal volume of the 3D printed mold and a surface of the 3D printed mold.

7. The method of claim 1, further comprising:
determining a digital file associated with the 3D printed mold;
determining, from the digital file associated with the 3D printed mold, a geometry associated with at least one surface of the 3D printed mold;
selecting a light source arrangement to provide illumination of the 3D printed mold based on the at least one surface; and
providing the illumination of the 3D printed mold using the light source arrangement, wherein the illumination provided by the light source arrangement enhances one or more features of the 3D printed mold to facilitate capture of one or more features of the 3D printed mold.

8. The method of claim 1, wherein the one or more types of manufacturing defect comprise at least one of a break or a hole in a wall of the 3D printed mold.

9. A method of manufacturing, comprising:
printing a mold associated with a dental arch of a patient based on a digital model of the mold; and
analyzing a quality of the mold, the analyzing comprising:
generating one or more images of the mold using one or more imaging devices;
processing the one or more images of the mold to determine one or more quality-related properties of the mold; and
determining whether to use the mold to form an orthodontic aligner based on the one or more quality-related properties.

10. The method of claim 9, further comprising:
determining that the mold is usable to form the orthodontic aligner;
forming the orthodontic aligner over the mold; and
trimming the orthodontic aligner.

11. The method of claim 10, further comprising:
generating one or more images of the orthodontic aligner; and
determining whether the orthodontic aligner has a manufacturing defect based on processing the one or more images of the orthodontic aligner.

12. The method of claim 9, further comprising:
forming the orthodontic aligner over the mold;
trimming the orthodontic aligner;
determining that the orthodontic aligner has a manufacturing defect; and
determining that the manufacturing defect of the orthodontic aligner is attributable to the mold.

13. The method of claim 9, further comprising:
determining that the mold is not usable to form the orthodontic aligner;
classifying the mold as defective; and
printing a new mold associated with the dental arch of the patient.

14. The method of claim 9, wherein the processing is performed using a machine learning model trained to identify one or more types of manufacturing defects of a 3D printing process, wherein an output of the machine learning model comprises, for each type of manufacturing defect, a probability that the one or more images comprises a defect of that type of manufacturing defect.

15. The method of claim 14, wherein the one or more types of manufacturing defect comprise at least one of a break or a hole in a wall of the mold.

16. The method of claim 9, further comprising:
determining that the mold comprises one or more defects based on the quality-related properties;
determining a severity of the one or more defects; and
determining, based at least in part of the severity of the one or more manufacturing defects, that the one or more manufacturing defects alone or together will degrade a performance of the mold.

17. A manufacturing system, comprising:
a three-dimensional (3D) printer, to generate a 3D printed mold associated with a dental arch of a patient based on a digital model of the 3D printed mold;
an image capture device, to generate one or more images of the 3D printed mold; and
a processor, to:
receive the one or more images of the 3D printed mold;
process the one or more images of the 3D printed mold to determine one or more quality-related properties of the 3D printed mold; and
determine whether to use the 3D printed mold to form an orthodontic aligner based on the one or more quality-related properties.

18. The manufacturing system of claim 17, further comprising:
thermoforming equipment, to thermoform the orthodontic aligner over the 3D printed mold; and
trimming equipment, to trim the orthodontic aligner.

19. The manufacturing system of claim 18, wherein the thermoforming equipment is to thermoform the orthodontic aligner over the 3D printed mold responsive to a determination by the processor that the 3D printed mold is usable to form the orthodontic aligner.

20. The manufacturing system of claim 18, further comprising:
an additional image capture device to generate one or more images of the orthodontic aligner;
wherein the processor is further to determine whether the orthodontic aligner has a manufacturing defect based on processing the one or more images of the orthodontic aligner.

21. The manufacturing system of claim 20, wherein the processor is further to:
determine that the orthodontic aligner has a manufacturing defect; and
determine that the manufacturing defect of the orthodontic aligner is attributable to the 3D printed mold.

22. The manufacturing system of claim 17, wherein the processor is further to:
determine that the 3D printed mold is not usable to form the orthodontic aligner;

classify the 3D printed mold as defective; and
print a new 3D printed mold associated with the dental arch of the patient.

23. The manufacturing system of claim 17, wherein a machine learning model trained to identify one or more types of manufacturing defects of a 3D printing process is used to process the one or more images, wherein an output of the machine learning model comprises, for each type of manufacturing defect, a probability that the one or more images comprises a defect of that type of manufacturing defect.

24. The manufacturing system of claim 23, wherein the one or more types of manufacturing defect comprise at least one of a break or a hole in a wall of the 3D printed mold.

25. The manufacturing system of claim 17, wherein the processor is further to:
   determine that the 3D printed mold comprises one or more defects based on the one or more quality-related properties;
   determine a severity of the one or more defects; and
   determine, based at least in part of the severity of the one or more defects, that the one or more defects alone or together will degrade a performance of the 3D printed mold.

* * * * *